(12) United States Patent
Shi

(10) Patent No.: US 12,067,035 B2
(45) Date of Patent: Aug. 20, 2024

(54) METHOD AND APPARATUS FOR REPORTING MOVEMENT PATH, STORAGE MEDIUM, AND ELECTRONIC DEVICE

(71) Applicant: YULONG COMPUTER TELECOMMUNICATION SCIENTIFIC (SHENZHEN) CO., LTD, Shenzhen (CN)

(72) Inventor: Aimin Shi, Shenzhen (CN)

(73) Assignee: YULONG COMPUTER TELECOMMUNICATION SCIENTIFIC (SHENZHEN) CO., LTD, Shenzhen (CN)

( * ) Notice: Subject to any disclaimer, the term of this patent is extended or adjusted under 35 U.S.C. 154(b) by 26 days.

(21) Appl. No.: 17/941,390

(22) Filed: Sep. 9, 2022

(65) Prior Publication Data

US 2023/0083205 A1   Mar. 16, 2023

Related U.S. Application Data

(63) Continuation of application No. PCT/CN2021/074476, filed on Jan. 29, 2021.

(30) Foreign Application Priority Data

Mar. 31, 2020 (CN) .......... 202010243671.6

(51) Int. Cl.
*G06F 17/30* (2006.01)
*G06F 16/23* (2019.01)
(Continued)

(52) U.S. Cl.
CPC .......... *G06F 16/29* (2019.01); *G06F 16/2358* (2019.01); *G06F 16/2457* (2019.01)

(58) Field of Classification Search
CPC ........ G06F 16/13; G06F 16/24; G06F 16/156; G06N 3/00; G06N 5/00; G05B 13/00
See application file for complete search history.

(56) References Cited

U.S. PATENT DOCUMENTS 8,301,639 B1 * 10/2012 Myllymaki ....... G06F 16/90324
 707/751
8,483,705 B1   7/2013 Cope et al.
(Continued)

FOREIGN PATENT DOCUMENTS

CN    1952680 A    4/2007
CN  101583076 A   11/2009
(Continued)

OTHER PUBLICATIONS

Track Itineraries Recording and Position Monitoring System for Maritime Cooperative Targets (English abstract provided) pp. 1-5.
(Continued)

*Primary Examiner* — Hung D Le
(74) *Attorney, Agent, or Firm* — George R. McGuire; Bond Schoeneck & King PLLC

(57) ABSTRACT

The present disclosure provides a method for reporting a movement path and an electronic device. The method is applied to an intelligent locator and includes receiving, a movement path acquisition request sent by a reporting device within a reporting time threshold; acquiring a movement path including at least one piece of unreported location information from a database; and sending the movement path to the reporting device.

11 Claims, 14 Drawing Sheets

(51) Int. Cl.
 *G06F 16/2457* (2019.01)
 *G06F 16/29* (2019.01)

(56) References Cited

U.S. PATENT DOCUMENTS

| | | | | |
|---|---|---|---|---|
| 8,538,973 | B1* | 9/2013 | Gonzalez | G06F 16/9537 |
| | | | | 707/758 |
| 10,444,018 | B2* | 10/2019 | Miller | G06F 3/012 |
| 10,657,784 | B1* | 5/2020 | Gordon | G08B 13/1966 |
| 10,679,177 | B1* | 6/2020 | Liberato, Jr. | G06Q 10/087 |
| 10,867,495 | B1* | 12/2020 | Venetianer | G08B 13/19671 |
| 10,873,697 | B1* | 12/2020 | Jain | H04N 21/234318 |
| 2010/0266159 | A1* | 10/2010 | Ueki | G06V 40/173 |
| | | | | 382/103 |
| 2011/0080336 | A1* | 4/2011 | Leyvand | G06F 3/017 |
| | | | | 382/103 |
| 2012/0020518 | A1* | 1/2012 | Taguchi | G06T 7/292 |
| | | | | 382/103 |
| 2012/0026335 | A1* | 2/2012 | Brown | G06T 7/292 |
| | | | | 382/103 |
| 2012/0093364 | A1* | 4/2012 | Sato | G06T 7/277 |
| | | | | 382/103 |
| 2012/0170804 | A1* | 7/2012 | Lin | G06T 7/248 |
| | | | | 382/103 |
| 2013/0110822 | A1* | 5/2013 | Ikeda | G06F 16/29 |
| | | | | 707/E17.082 |
| 2013/0165147 | A1* | 6/2013 | Alpert | H04W 24/10 |
| | | | | 455/456.2 |
| 2013/0210454 | A1* | 8/2013 | O'Sullivan | H04W 4/02 |
| | | | | 455/456.1 |
| 2015/0019391 | A1* | 1/2015 | Kumar | G06Q 10/087 |
| | | | | 705/28 |
| 2015/0072640 | A1* | 3/2015 | Otto | G16H 40/67 |
| | | | | 455/404.2 |
| 2015/0154554 | A1 | 6/2015 | Skaaksrud | |
| 2015/0278494 | A1* | 10/2015 | Newstadt | G06F 21/316 |
| | | | | 726/3 |
| 2016/0349353 | A1* | 12/2016 | Wang | G01S 5/02213 |
| 2017/0064665 | A1* | 3/2017 | Deloach | G01C 21/206 |
| 2017/0316271 | A1* | 11/2017 | Saitou | G06Q 20/20 |
| 2018/0149755 | A1* | 5/2018 | Mendis | G01S 19/48 |
| 2018/0176737 | A1* | 6/2018 | Subramaniyan | H04W 4/023 |
| 2018/0279220 | A1 | 9/2018 | Chiu et al. | |
| 2018/0364295 | A1* | 12/2018 | Schwartz | G06T 11/60 |
| 2019/0005153 | A1* | 1/2019 | Riley | G06F 16/435 |
| 2019/0279486 | A1* | 9/2019 | Mandali | G08B 21/24 |
| 2019/0317622 | A1* | 10/2019 | Leigh | G06F 3/04166 |
| 2020/0019928 | A1 | 1/2020 | Skaaksrud | |
| 2020/0092682 | A1* | 3/2020 | Winograd | G01S 19/34 |
| 2020/0162262 | A1* | 5/2020 | Shekh-Yusef | H04L 63/107 |
| 2020/0248433 | A1* | 8/2020 | Sharma | E02F 9/2087 |
| 2020/0263863 | A1* | 8/2020 | Trivelpiece | H05B 47/19 |
| 2020/0272924 | A1* | 8/2020 | Bianchi | G06N 5/045 |
| 2020/0275216 | A1* | 8/2020 | McKinney | A61B 5/126 |
| 2020/0314731 | A1* | 10/2020 | Ryu | H04W 64/003 |
| 2021/0369143 | A1* | 12/2021 | Ferber | G06N 20/10 |
| 2021/0402921 | A9* | 12/2021 | Cordova | G06N 5/04 |
| 2023/0267758 | A1* | 8/2023 | Shaker | G06V 40/12 |
| | | | | 382/124 |

FOREIGN PATENT DOCUMENTS

| | | |
|---|---|---|
| CN | 103731799 A | 4/2014 |
| CN | 104065712 A | 9/2014 |
| CN | 105050038 A | 11/2015 |
| CN | 105137465 A | 12/2015 |
| CN | 105163266 A | 12/2015 |
| CN | 106453832 A | 2/2017 |
| CN | 107479744 A | 12/2017 |
| CN | 109633719 A | 4/2019 |

OTHER PUBLICATIONS

"Design and implementation of pipeline public opinion monitoring platform based on distributed geofencing" Yi, et al., Technical Exchange 35 Surveying and Mapping Technical Equipment vol. 21 Issue 1, 2019. pp. 1-4.
CN First Office Action—202010243671.6. pp. 1-15.
CN Second Office Action—2 02010243671.6. pp. 1-15.
International Search Report and Written Opinion for PCT/CN2021/074476, filed Jan. 29, 2021. pp. 1-11.

* cited by examiner

METHOD AND APPARATUS FOR REPORTING MOVEMENT PATH, STORAGE MEDIUM, AND ELECTRONIC DEVICE

CROSS-REFERENCE TO RELATED APPLICATIONS

The application is a by-pass continuation of International Application No. PCT/CN2021/074476 filed on Jan. 29, 2021, which claims priority of Chinese patent application 202010243671.6, filed on Mar. 31, 2020, under 35 U.S.C. § 371, both applications are incorporated herein by reference in their entireties.

TECHNICAL FIELD

The present application relates to the technical field of computers, and in particular to a method and apparatus for reporting a movement path, a storage medium, and an electronic device.

BACKGROUND

The background description provided herein belongs to the relevant art related to the present application, and is merely used for describing and explaining the content of the present application, and is neither expressly nor impliedly admitted as prior art against the present application.

With the development of wireless location technology, location based services have increasingly become an indispensable part of the work and life of people. At the same time, intelligent locators with the location based services are also emerging, after establishing pairing relationships with the intelligent locators through electronic devices (mobile phones, computers, etc.), guardians may master movement locations of objects (children, the elderly, pets, suspects and other objects) under guardianship, of the intelligent locators at any time through the electronic devices, and in the process, the intelligent locators are required to report the movement locations.

At present, in the process of reporting the movement locations, the intelligent locators periodically send located movement locations to the electronic devices (mobile phones, computers, etc.) through networks, so that users of the electronic devices may know movement paths of the intelligent locators. However, in this manner, the intelligent locators need to report the located movement locations to the electronic devices every other period, and reporting frequency is usually very high, resulting in a high power consumption of the intelligent locators during the process of reporting the movement locations.

SUMMARY

Embodiments of the present application provide an application recommendation method and apparatus, a storage medium, and an electronic device, which may reduce a location reporting frequency of an intelligent locator, thus reducing power consumption resulting from reporting of movement locations. The technical solutions are as follows:

in a first aspect, the embodiments of the present application provide a method for reporting a movement path, and the method includes:
receiving, within a reporting time threshold, a movement path acquisition request sent by a reporting device;
acquiring, from a database, a movement path including at least one piece of unreported location information; and
sending the movement path to the reporting device.

In a second aspect, the embodiments of the present application provide another method for reporting a movement path, and the method includes:
receiving an input movement path acquisition request and sending the movement path acquisition request to an intelligent locator, and the movement path acquisition request being used for indicating the intelligent locator to acquire, from a database, a movement path including at least one piece of unreported location information; and
receiving the movement path sent by the intelligent locator.

In a third aspect, the embodiments of the present application provide a movement path reporting apparatus, and the apparatus includes:
an acquisition request receiving module used for receiving, within a reporting time threshold, a movement path acquisition request sent by a reporting device;
a movement path acquisition module used for acquiring, from a database, a movement path including at least one piece of unreported location information; and
a movement path sending module used for sending the movement path to the reporting device.

In a fourth aspect, the embodiments of the present application provide a movement path reporting apparatus, and the apparatus includes:
an acquisition request sending module used for receiving an input movement path acquisition request and sending the movement path acquisition request to an intelligent locator, and the movement path acquisition request being used for indicating the intelligent locator to acquire, from a database, a movement path including at least one piece of unreported location information; and
a movement path receiving module used for receiving the movement path sent by the intelligent locator.

In a fifth aspect, the embodiments of the present application provide a computer storage medium, a plurality of instructions are stored in the computer storage medium, and the instructions are suitable for being loaded by a processor and executing the above method steps.

In a sixth aspect, the embodiments of the present application provide an electronic device which may include: a processor and a memory, wherein a computer program is stored in the memory, and the computer program is suitable for being loaded by the processor and executing the above method steps.

The beneficial effects brought by the technical solutions provided by some embodiments of the present application at least include:

in one or more embodiments of the present application, when the intelligent locator receives, within the reporting time threshold, the movement path acquisition request sent by the reporting device, the intelligent locator acquires, from the database, the movement path including at least one piece of unreported location information. The intelligent locator only needs to send the movement path including at least one piece of unreported location information to the reporting device after receiving the movement path acquisition request instead of reporting the located movement locations every other period, so that the reporting frequency of the intelligent locator may be reduced, thus power consumption resulting from reporting of the movement locations is reduced, and then endurance capability of the intelligent locator is improved.

BRIEF DESCRIPTION OF DRAWINGS

In order to describe the technical solutions in the embodiments of the present application or in the prior art more clearly, the drawings that need to be used in the description of the embodiments or the prior art are briefly introduced below. Apparently, the drawings in the description below show merely some embodiments of the present application, and those of ordinary skill in the art may also acquire other drawings based on these drawings without any creative efforts.

DETAILED DESCRIPTION OF THE EMBODIMENTS

The technical solutions in the embodiments of the present application are described clearly and completely below in combination with the drawings in the embodiments of the present application. Apparently, the described embodiments are merely a part of the embodiments of the present application, rather than all of the embodiments. On the basis of the embodiments in the present application, all other embodiments acquired by those of ordinary skill in the art without creative efforts fall within a protection scope of the present application.

In the description of the present application, it needs to be understood that the terms "first", "second", etc. are merely used for descriptive purposes, and cannot be understood as indicating or implying relative importance. In the description of the present application, it needs to be noted that unless otherwise expressly specified and limited, "including" and "having" and any variations thereof are intended to cover non-exclusive inclusions. For example, processes, methods, systems, products or devices that include a series of steps or units are not limited to the listed steps or units, but alternatively further include unlisted steps or units, or alternatively further include other steps or units inherent to these processes, methods, products or devices. The meanings of above terms in this application may be understood in specific cases to those of ordinary skill in the art. In addition, in the description of the present application, unless otherwise noted, "plurality" means two or more. "and/or", which describes the association relationship between associated objects, indicates that three relationships may exist, for example, A and/or B, which may indicate the following three cases: A alone, both A and B, and B alone. The character "/" generally indicates an "or" relationship between former and later associated objects.

The present application is described in detail below in combination with the specific embodiments.

Figure 1:
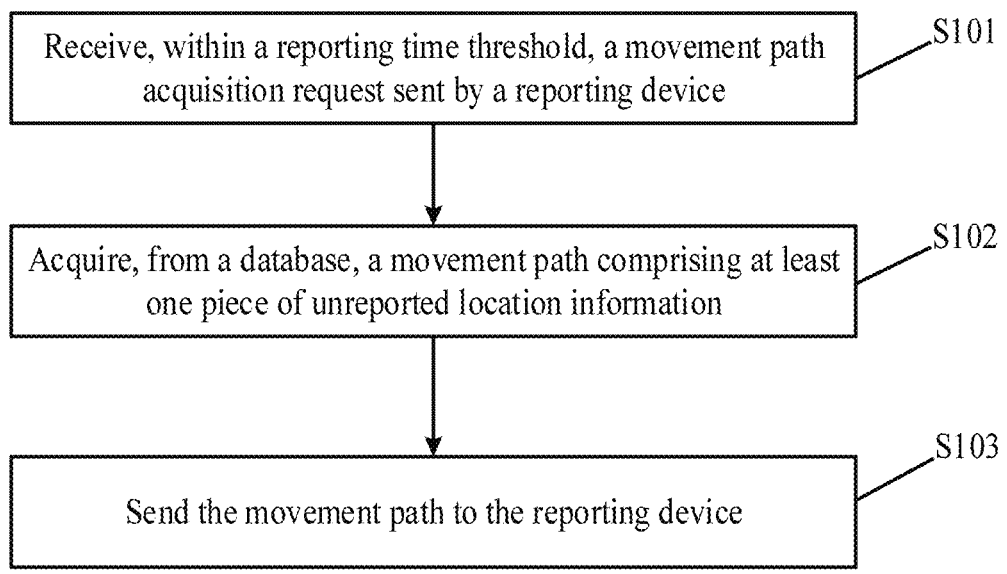
FIG. 1 is a schematic flowchart of a method for reporting a movement path, which is provided by the embodiments of the present application.

In one embodiment, as shown in FIG. 1, a method for reporting a movement path is especially proposed, and the method may be implemented by a computer program and may run in a movement path reporting apparatus and based on a Von Neumann system. The computer program may be integrated into an application or may run as an independent tool application. In the following, in order to better interpret the method for reporting the movement path, the movement path reporting apparatus is taken as an intelligent locator for detailed interpretation.

The intelligent locator may be an electronic device having a function of reporting a movement path, the electronic device may be an intelligent wearable device, and the intelligent wearable device is a general term of wearable devices which are developed by intelligently designing daily wear by applying a wearable technology. The electronic device in a broad sense includes electronic devices with complete functions and capable of realizing complete or partial functions without relying on terminals (such as smart phones), for example, intelligent locating watches or intelligent locating glasses, intelligent locating trackers, and the like, and the electronic device in a broad sense also includes electronic devices which only focus on a certain type of locating application functions and need to be used cooperatively with other devices such as smart phones, for example, various types of electronic devices such as intelligent locating bracelets for monitoring physical signs, intelligent locating jewelry.

Specifically, the method for reporting the movement path includes:

step S101: receiving, within a reporting time threshold, a movement path acquisition request sent by a reporting device.

The threshold is a threshold value of a certain field, status or system, and also called as a critical value. In the embodiments of the present application, the reporting time threshold may be understood as a threshold value or a critical value for movement path reporting. It may be understood that when the intelligent locator receives, within the reporting time threshold, the movement path acquisition request sent by the reporting device (such as a terminal, a server), the intelligent locator responds to the movement path acquisition request, acquires a movement path and sends the movement path to the reporting device.

The reporting time threshold may be a factory default of the intelligent locator; and the reporting time threshold of the intelligent locator may also be customized by a user in daily use, and one customization manner is that the user inputs a change instruction with regard to the reporting time threshold in the intelligent locator, for example, the reporting time threshold is input through a voice, for another example, when the intelligent locator includes a touchable touch screen, the user may carry out setting change on the reporting time threshold in the intelligent locator in a manner of finger touch so as to complete customization for the reporting time threshold. The other customization manner is completed through the reporting device that establishes a pairing relationship with the intelligent locator, for example, setting is carried out through the reporting device, that is, a terminal.

In a specific implementation scene, the reporting device, that is, the terminal, is taken as an example, and one customization manner may be determined on the basis of the change instruction input by the user for the reporting time threshold. The terminal may include a touch screen, and the touch screen has a function of sensing touch operation of the user. The structure of the touch screen at least includes four parts: a screen glass layer, a sensor film, a display panel layer, and a controller board, wherein the sensor film is provided with a touch sensor layer which includes a plurality of sensors such as a pressure sensor and a location sensor; and when the user touches an icon for changing the reporting time threshold in a current display interface of the terminal, the touch screen of the terminal can acquire a location parameter of the touch through the sensors. Then the location parameter is processed, and the icon for changing the reporting time threshold in the display interface and corresponding to the location parameter is identified to be touched, the electronic device may acquire the change instruction input by the user to carry out corresponding change.

Figure 2:
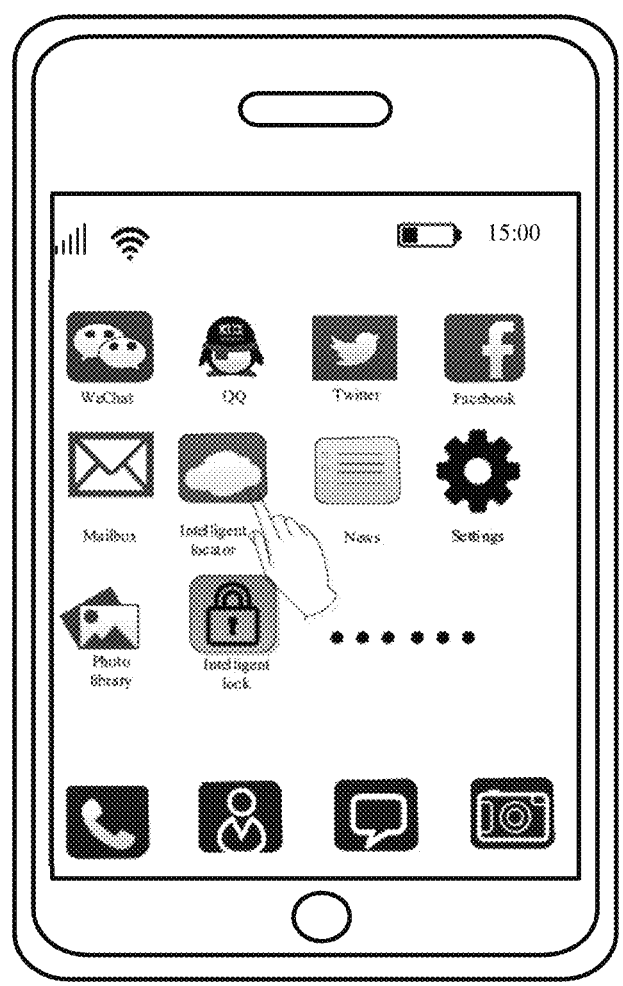
FIG. 2 is a schematic diagram of an interface of a terminal involved in a method for reporting a movement path, which is provided by the embodiments of the present application.

As shown in FIG. 2 which is a schematic diagram of an interface of a terminal, and a plurality of application icons are displayed in the display interface of the terminal shown in FIG. 2, such as an intelligent locator icon, a mailbox icon, and a setting icon.

Figure 3:
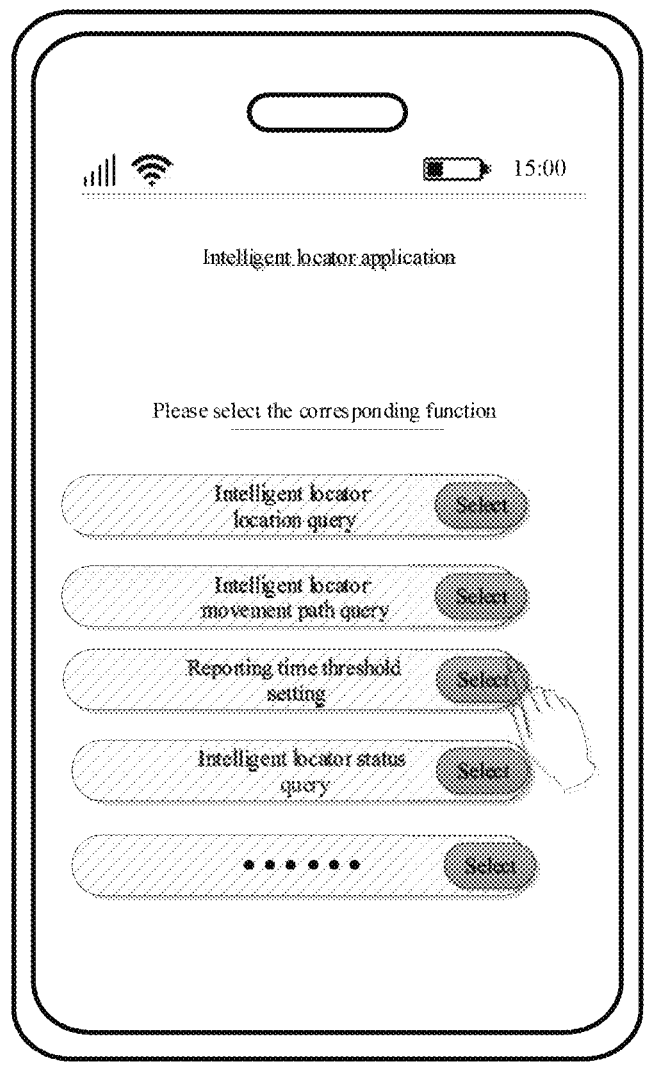
FIG. 3 is a schematic diagram of an interface of an intelligent locator application involved in a method for reporting a movement path, which is provided by the embodiments of the present application.
Figure 4:
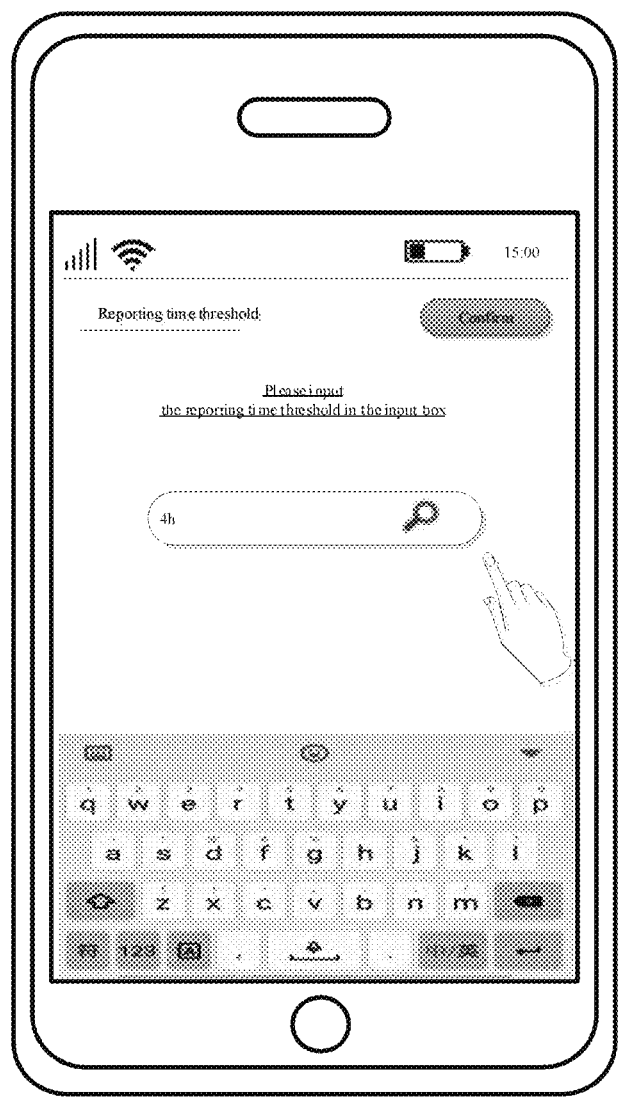
FIG. 4 is a schematic diagram of an interface of an intelligent locator application involved in a method for reporting a movement path, which is provided by the embodiments of the present application.

When the user selects the "intelligent locator" icon in the touch screen of the terminal in a manner of finger touch, specifically, the user touches the screen glass layer on the touch screen through finger touch, the touch screen of the terminal acquires the location parameter corresponding the touch with the "intelligent locator" icon through the location sensor in the sensor film, then the location parameter is processed, an instruction of starting the "intelligent locator", which is input by the user, is identified, and at this moment, an "intelligent locator" application is started by reading and executing a machine-executable instruction corresponding to control logic of starting the "intelligent locator". As shown in FIG. 3 which is a schematic diagram of an interface of an intelligent locator application, a plurality of function options are included in the interface of the intelligent locator application shown in FIG. 3, such as an intelligent locator location query option, an intelligent locator movement path query option, and a reporting time threshold setting option, the user may touch the "reporting time threshold setting" option in the current interface of the intelligent locator application through a finger, the terminal displays the "reporting time threshold setting" interface at this moment; and as shown in FIG. 4 which is a schematic diagram of an interface of reporting time threshold setting, the user may input a customized reporting time threshold in an input box in FIG. 4, for example, the reporting time threshold is set to be 4 h in a customized manner, and then is stored, at this moment, the terminal generates a change instruction with regard to the reporting time threshold of the intelligent locator, the change instruction carries: the reporting time threshold 4 h, and the intelligent locator receives the change instruction and completes the user-customized setting for the reporting time threshold.

Further, the reporting device may be a terminal or a server;

when the user, within the reporting time threshold, inputs an acquisition instruction with regard to the movement path of the intelligent locator in the interface of the intelligent locator application of the terminal, the terminal generates a movement path acquisition request; and in an implementation scene, the terminal may send the movement path acquisition request to the server, and the server sends the movement path acquisition request to the intelligent locator. It may be understood that the terminal cannot directly communicate with the intelligent locator at this moment, and the server is required to be taken as a relay to forward the received movement path acquisition request. The intelligent locator may receive, within the reporting time threshold, the movement path acquisition request sent by the terminal through the server; and in another implementation scene, the terminal may directly communicate with the intelligent locator, and after generating the movement path acquisition request, the terminal may send the movement path acquisition request to the intelligent locator on the basis of the communication connection between the terminal and the intelligent locator. At this moment, the intelligent locator may receive the movement path acquisition request sent by the terminal.

Further, the server and the intelligent locator may have a binding relationship, if the server needs to acquire the movement path of the intelligent locator at a certain time point which may be within the reporting time threshold, the server may generate a movement path acquisition request with regard to the intelligent locator, and send the movement path acquisition request to the intelligent locator to acquire the movement path of the smart locator, and so on.

Step S102: acquiring, from a database, a movement path including at least one piece of unreported location information.

The database is a location service library used for storing the location information of the intelligent locator, in the intelligent locator, and in practical application, the database may be a database based on location based services (LBS), that is, a LBS database.

The location based services (LBS) are used for acquiring the current location of a locating device (such as the intelligent locator) by virtue of various types of locating technologies; and it may be understood that the intelligent locator includes a LBS service module, and the LBS services may provide information resources and basic services to the locating device (such as the intelligent locator) through the mobile Internet. Through the LBS, firstly, a local end (such as the intelligent locator) may determine a spatial location of the local end (such as the intelligent locator) by virtue of the locating technology, and then the local end (such as the intelligent locator) may acquire resources and information related to the location through the mobile Internet. A plurality of information technologies such as mobile communication, Internet, spatial location, location information, and big data are integrated into the LBS, and data updating and interaction are carried out by virtue of a mobile Internet service platform; and electronic devices (such as a terminal and a server) that subscribe to the LBS may acquire the corresponding services.

Specifically, in actual work, the intelligent locator may acquire the current movement location in real time by adopting a location acquisition technology; or, the intelligent locator acquires the current movement location periodically (for example, every 5 minutes) by adopting a location acquisition technology. After the movement location is acquired, a timestamp corresponding to a current locating time point may be added to the movement location, location information is generated, and the location information is added into the database.

Specifically, the intelligent locator receives the movement path acquisition request sent by the reporting device, responds to the movement path acquisition request, and acquires the unreported location information from the database of the local end to generate a movement path including at least one piece of unreported location information. It may be understood that the unreported location information includes the movement location and the timestamp, on the basis of the movement location and the timestamp of each piece of the location information in the at least one piece of location information, the movement locations corresponding to the timestamps of the adjacent time points may be connected in pairs, and the movement path may be acquired. Therefore, usually, when the reporting device acquires the movement path, the intelligent locator may acquire a location set including the at least one piece of location information in the database of the local end, and the location set is the acquired movement path.

Further, the location information corresponding to each locating time point of the intelligent locator is usually included in the database, the location information at least includes reported status and unreported status, in order to distinguish the type of the location information in the database, a status identifier may be added to the location information, when the intelligent locator acquires, from the database, at least one piece of unreported location information included in the movement path, the unreported location information may be acquired through the status identifier, and specifically, the location information with the status identifier which is the unreported status, is acquired.

Step S103: sending the movement path to the reporting device.

The reporting device may be a terminal or a server.

In a specific implementation scene, the intelligent locator receives the movement path acquisition request, the movement path acquisition request is directly sent to the intelligent locator by the reporting device, that is, the terminal, and the intelligent locator responds to the movement path acquisition request, acquires the movement path of the intelligent locator from the database of the local end, and then sends the movement path to the reporting device, that is, the terminal, through communication connection with the terminal.

In a specific implementation scene, the intelligent locator receives the movement path acquisition request, the movement path acquisition request is directly sent to the intelligent locator by the reporting device, that is, the terminal, via the server, the intelligent locator responds to the movement path acquisition request, acquires the movement path of the intelligent locator from the database of the local end, and sends the movement path to the server through communication connection with the server, and the server sends the movement path to the reporting device, that is, the terminal. It may be understood that at this moment, the server is taken as a relaying device to forward communication data.

In a specific implementation scene, the intelligent locator receives the movement path acquisition request, the movement path acquisition request is directly sent to the intelligent locator by the reporting device, that is, the server, and the server and the intelligent locator may have a binding relationship. The intelligent locator responds to the movement path acquisition request, acquires the movement path of the intelligent locator from the database of the local end, and sends the movement path to the server through communication connection with the server. Further, after receiving the movement path, the server may distribute the movement path to the electronic devices (mobile phones, computers, etc.) that subscribe to the location based services (such as LBS) of the intelligent locator.

In the embodiments of the present application, when the intelligent locator receives, within the reporting time threshold, the movement path acquisition request sent by the reporting device, the intelligent locator acquires, from the database, the movement path including at least one piece of unreported location information. The intelligent locator only needs to send the movement path including at least one piece of unreported location information to the reporting device after receiving the movement path acquisition request instead of reporting the located movement locations every other period, so that the reporting frequency of the intelligent locator may be reduced, thus power consumption resulting from reporting of the movement locations is reduced, and then endurance capability of the intelligent locator is improved.

Figure 5:
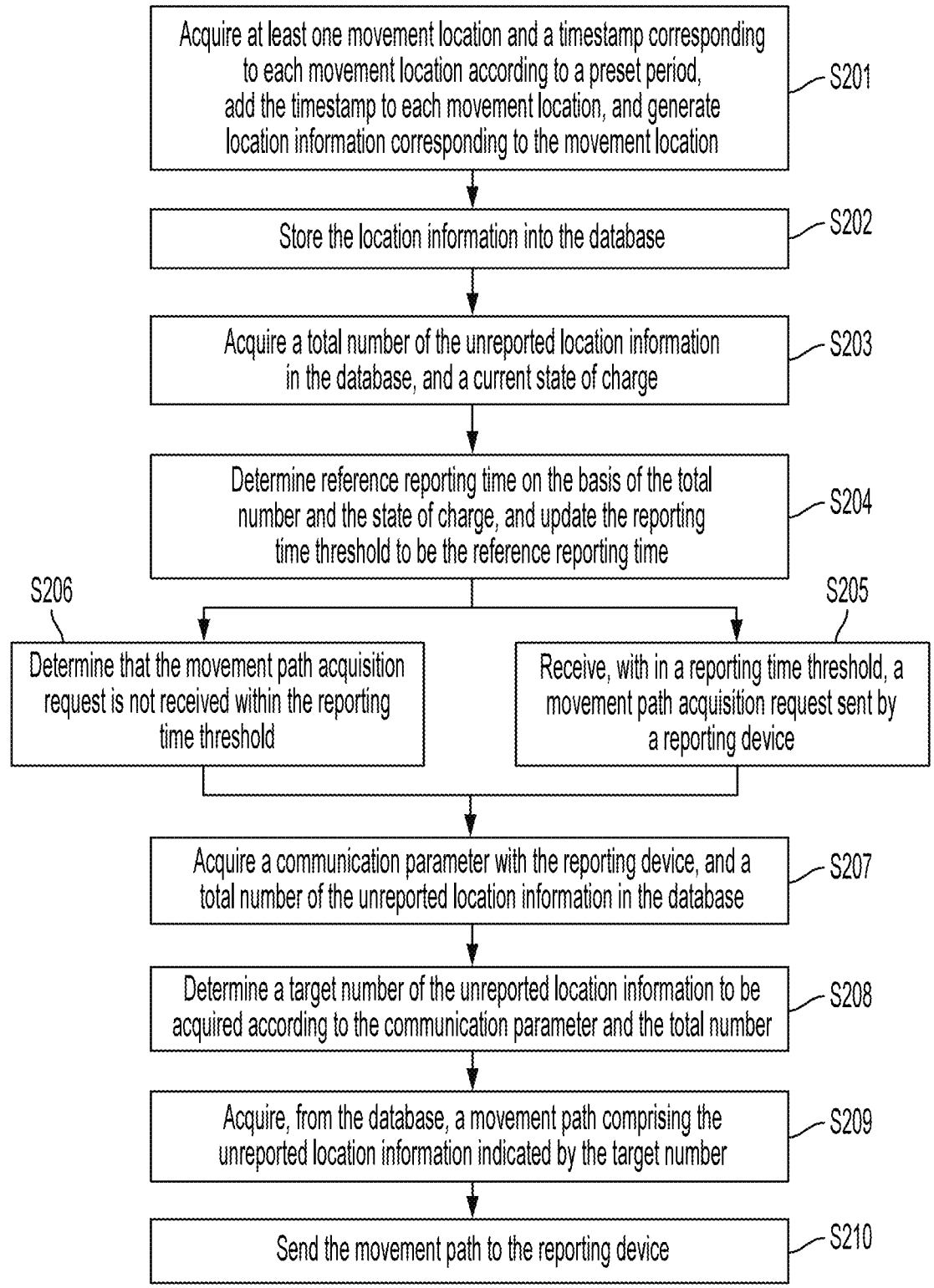
FIG. 5 is a schematic flowchart of another method for reporting a movement path, which is provided by the embodiments of the present application.

Referring to FIG. 5 which is a schematic flowchart of another method for reporting a movement path, which is disclosed by the present application. In the following, in order to better interpret the method for reporting the movement path, the movement path reporting apparatus is taken as an intelligent locator for detailed interpretation.

Specifically, the method for reporting the movement path includes:

step S201: acquiring at least one movement location and a timestamp corresponding to each movement location according to a preset period, adding the timestamp to each movement location, and generating location information corresponding to the movement location.

The movement location represents the location of the intelligent locator, usually, the location, occupied place or orientation of the intelligent locator may be represented in the form of longitude and latitude, coordinates, a direction, an orientation, and the like.

The timestamp represents complete and verifiable data of a certain location located at a specific time point, usually, the timestamp is a character sequence used for providing the user (such as the locator and the terminal) with an electronic evidence to prove the locating time point of a certain movement location.

In practical applications, after the locating function of the intelligent locator is started, the movement location is acquired, usually, the movement locations acquired by the intelligent locator within a certain time period by virtue of a preset location acquisition technology are usually the same or a distance between every two movement locations is small, and the intelligent locator optimizes the locating manner after the locating function is started from the perspective of reducing power consumption of the device.

Specifically, the electronic device may set a preset period, and acquire, within the preset period, the currently located movement location by virtue of a preset location acquisition technology, the preset period may be understood as a locating time interval, for example, if the preset period is 3 minutes, the intelligent locator acquires the movement location every 3 minutes. The preset period may be a default locating period of the intelligent locator while leaving a factory, or may be set by the user in a customized manner in the later use process, and one customized setting manner is that the user directly sets in the intelligent locator (for example, the user sets the preset period to be a certain locating period by pressing a physical button); and the other customized setting manner is that the user sets through a receiving device that establishes a binding relationship with the intelligent locator, for example, the user sets in the receiving device, that is, the terminal.

Specifically, the intelligent locator, within a period of time (such as the reporting time threshold), acquires the movement location and the timestamp corresponding to the movement location every preset period. It may be understood that within the period of time (such as the reporting time threshold), the intelligent locator may usually acquire at least one movement location and the timestamp corresponding to each movement location; and meanwhile, the intelligent locator adds the timestamp to each movement location, and generates location information corresponding to the movement location.

It may be understood that the receiving device may analyze on the basis of the location information, and may determine the movement location of the intelligent locator at a certain time point (time corresponding to the timestamp) on the basis of the timestamp in an analysis result.

The movement location mentioned in the embodiments of the present application may be acquired by the intelligent locator by adopting the corresponding location acquisition technology, and the location acquisition technology includes but is not limited to: a wireless location technology, a short-range connection technology, a sensor technology, a location image processing technology and the like, where:

the wireless location technology includes but is not limited to: a satellite location technology, an infrared indoor location technology, an ultrasonic location technology, a Bluetooth technology, a radio frequency identification technology, an ultra wideband technology, a Wi-Fi technology, a ZigBee technology, and the like.

The sensor technology is used for realizing determination for the location of the intelligent locator by virtue of sensors capable of sensing the location, such as a proximity sensor and the like.

The image processing technology is used for carrying out anticipation processing on a location image taken by a camera to acquire the location information and the like.

Step S202: storing the location information into the database.

Specifically, after adding the timestamp to the movement location, and generating the location information corresponding to the movement location, the intelligent locator may store the location information into the database. Further, in order to distinguish from the reported location information in the database, a status identifier may be added to the unreported location information, and the status identifier may be used for identifying whether the location information is sent to the reporting device or not. In specific implementation, a reported status identifier is added to the reported location information, and an unreported status identifier is added to the unreported location information.

Step S203: acquiring a total number of the unreported location information in the database, and a current state of charge.

The state of charge (SOC) is a proportion of available charge in a power supply module, that is, a battery, of the intelligent locator to a nominal capacity, and is an important monitoring data for the electronic device to realize battery management, and the intelligent locator usually may control the working status of the battery according to the SOC value. The state of charge of the battery also reflects the charge status of the battery, and the representation form of the state of charge may be in the form of percentage of charge, or in the form of residual capacitance and the like.

Specifically, the intelligent locator may monitor the unreported location information in the database in real time or periodically (for example, 1 hour), and specifically, the intelligent locator counts a total number of the location information with the status identifiers which are the unreported status identifiers, in the database, and meanwhile acquires the current state of charge.

In a specific implementation scene, the intelligent locator may acquire the current state of charge by sending a corresponding acquisition instruction with regard to the status information of the power supply module, and carrying out analysis processing on the basis of the acquired status information of the power supply module to acquire the state of charge of the intelligent locator. For example, by issuing an "adb shell dumpsys battery" acquisition instruction, various status information (such as a charging status, a real-time temperature, a real-time voltage, a real-time current, the state of charge and the like) of the power supply module may be returned through the acquisition instruction, then the state of charge of the intelligent locator may be acquired by looking up a parameter corresponding to "level (percentage)", and the state of charge is in the form of percentage of charge.

Step S204: determining reference reporting time on the basis of the total number and the state of charge, and updating the reporting time threshold to be the reference reporting time.

Specifically, after acquiring the total number of the unreported location information in the database, and the current state of charge, the intelligent locator may determine the reference reporting time on the basis of the total number and the state of charge to adjust and update the reporting time threshold. It may be understood that the number of the unreported location information and the state of charge are taken into consideration for the reporting time threshold, an appropriate reporting time threshold may be determined in combination with an actual working environment of the intelligent locator, and when the movement path acquisition instruction is not received within the reporting time threshold, the movement path including at least one piece of the unreported position information may be acquired from the database on the basis of the appropriate reporting time threshold.

In a feasible implementation scene, a linear table of the total number, the state of charge and the reference reporting time is stored in the intelligent locator, and after acquiring the total number and the state of charge, the intelligent locator acquires, from the linear table, the reference reporting time corresponding to the total number and the state of charge.

For example, see Table 1 for the linear table of a corresponding relationship of the total number a, the state of charge b, and the reference reporting time:

TABLE 1

| a b | 100% to 50% | 50% to 20% | 20% to 0% |
|---|---|---|---|
| 1000-800 | 4 hours | 2 hours | 1 hours |
| 800-500 | 5 hours | 4 hours | 1 hours |
| 500-300 | 6 hours | 5 hours | 2 hours |
| 300-200 | 8 hours | 6 hours | 3 hours |

It is assumed that the state of charge, which is acquired by the intelligent locator is 72%, and the total number of the unreported location information, which is acquired by the intelligent locator is 632, the reference reporting time corresponding to the state of charge 72% and the total number 632 is looked up from the above linear table, the reference reporting time is 5 hours via the looking-up, and at this moment, the electronic device updates the reporting time threshold to be 5 hours on the basis of the reference reporting time.

In a feasible implementation scene, a calculation model of the reference reporting time may be trained in advance, and the calculation model may be trained on the basis of a logarithmic model or a weight model, or may be realized on the basis of one or more of a logistic regression (LR) model, a support vector machine (SVM), a decision tree, a naive Bayesian classifier, a convolutional neural network (CNN), recurrent neural networks (RNNs) and the like; and a large number of sample data is acquired, the sample data includes the state of charge and the total number of the unreported location information, the sample data is input into an initial calculation model for training, and the trained calculation model may be obtained by training on the basis of the sample data which is already labeled with the reference the reporting time. After acquiring the total number and the state of charge, the intelligent locator inputs the total number and the state of charge into the calculation model, and outputs the reference reporting time.

In a feasible implementation manner, the type of a target environment where the intelligent locator is located, is determined according to at least one piece of the location information; and in practical applications, the environment where the intelligent locator is located may correspond to a plurality of types, such as an indoor environment type, a shopping mall environment type, a school environment type, and a scenic spot environment type, and the environment types may also include user-customized environment types, for example, the user may designate an electronic fence with regard to an activity area of the intelligent locator. It may be understood that the different environment types correspond to different reference reporting time.

In practical application, the intelligent locator may acquire a preset number of pieces of location information, environment identification is carried out according to the location information, an environment identification manner may be a manner of determining on the basis of a location range corresponding to the environment type, specifically, the type of the target environment is determined by judging whether the movement locations in the location information fall into the location range corresponding to the environment type or not. Then the reference reporting time corresponding to the type of the target environment is determined according to a corresponding relationship between the environment type and the reporting time, and the reporting time threshold is updated to be the reference reporting time.

Step S205: receiving, within a reporting time threshold, a movement path acquisition request sent by a reporting device.

Referring to step 101 for details, and details are not described herein again.

Step S206: determining that the movement path acquisition request is not received within the reporting time threshold.

The threshold is a threshold value of a certain field, status or system, and also called as a critical value. In the embodiments of the present application, the reporting time threshold may be understood as a threshold value or a critical value for movement path reporting. It may be understood that when the intelligent locator receives, within the reporting time threshold, the movement path acquisition request sent by the reporting device (such as a terminal and a server), the intelligent locator responds to the movement path acquisition request, acquires a movement path and sends the movement path to the reporting device.

Specifically, the intelligent locator receiving, within the reporting time threshold, the movement path acquisition request sent by the reporting device may be understood as that an upper device actively acquires the movement path of the intelligent locator from the reporting device in a manner of actively acquiring the movement path; and when the movement path acquisition request of the reporting device is not received within the reporting time threshold (for example, within 4 hours), for example, the user does not start the intelligent locator application in the reporting device, that is, the terminal to acquire the movement path within the reporting time threshold (for example, within 4 hours), at this moment, the intelligent locator may determine that the movement path acquisition request is not received within the reporting time threshold. Thus an automatic reporting function of the intelligent locator is triggered, that is, the intelligent locator may execute the steps of acquiring the movement path from the database and sending the movement path to the reporting device.

Step S207: acquiring a communication parameter with the reporting device, and the total number of the unreported location information in the database.

The communication parameter is at least one communication parameter between the intelligent locator and the reporting device, and communication quality corresponding to a current communication link between the intelligent locator and the reporting device may be represented through the communication parameter. It may be understood that when the communication quality is excellent, the intelligent locator may report location information with a relatively large amount of data.

Specifically, the intelligent locator detects the signal quality of a communication antenna in the included communication module to acquire the communication parameter with the reporting device.

The communication parameter includes but is not limited to reference signal receiving power (RSRP) of an uplink/downlink data signal of the current communication antenna, received signal code power (RSCP), a ratio (Edo) of received chip signal intensity to noise intensity/a ratio (EcNo) of power per modulation bit to noise spectrum density/signal-to-noise ratio (SNR)/reference signal receiving quality (RSRQ) of a signal received by the antenna, bit error ratio (BER)/block error rate (BLER)/packet error ratio (PER) of the signal received by the antenna, and the like; and signal quality evaluation for the current uplink/downlink data signal is realized through at least one of the parameters, and certainly, the signal quality evaluation for the current uplink/downlink data signal may also be realized by measuring other parameters, so that an appropriate target number is determined in combination with the total number of the unreported location information in the next step. It may be understood that the reporting is carried out by the movement path including the target number of the unreported location information, and usually, the reporting device may receive quickly.

It needs be noted that there are many communication parameters for measuring the uplink/downlink data signal, which may be a fitting of one or more of the above-mentioned parameters, and there is no specific limitation here.

Refer to step S203 for the step of acquiring, from the database, the total number of the unreported location information.

Step S208: determining a target number of the unreported location information to be acquired according to the communication parameter and the total number.

Specifically, the terminal may evaluate the communication quality of the communication link between the intelligent locator and the receiving device on the basis of at least one communication parameter, the maximum number of the location information capable of being sent, of the current communication link is determined by the communication quality, and the target number of the unreported location information to be acquired is determined in combination with the total number; and one manner is judging the value of the total number and the value of the maximum number, acquiring the minimum value between the total number and the maximum number, and taking the minimum value as the target number of the unreported location information to be acquired.

The communication parameter may be a fitting of one or more of the above-mentioned parameters.

The determining the maximum number of the location information capable of being sent, of the current communication link by the communication quality specifically is: the intelligent locator inputs the at least one communication parameter into a trained maximum number determination model, and then outputs the maximum number of the location information capable of being sent, of the current communication link.

Further, feature information is extracted by acquiring a large number of communication sample data in advance, the communication sample data is labeled with a reference number value, the feature information includes at least one communication parameter (RSCP, RSSI, SNR, and the like), and the maximum number determination model is created. The maximum number determination model may be realized on the basis of at least one of a convolutional neural network (CNN) model, a deep neural network (DNN) model, a recurrent neural network (RNN) model, an embedding model, a gradient boosting decision tree (GBDT) model and a logistic regression (LR) model, and the trained maximum number determination model may be obtained by training the maximum number determination model on the basis of the labeled sample data.

Step S209: acquiring, from the database, a movement path including the unreported location information indicated by the target number.

Specifically, after determining the target number of the unreported location information to be acquired according to the communication parameter and the total number, the intelligent locator acquires the target number of the unreported location information from the database, and takes the target number of the unreported location information as the acquired movement path. It may be understood that the unreported location information includes a movement location and a timestamp, on the basis of the movement location and the timestamp of each piece of the location information in the target number of the location information, the movement locations corresponding to the timestamps of the adjacent time points are connected in pairs, and the movement path may be acquired. Therefore, usually, when the reporting device acquires the movement path, the intelligent locator may acquire a location set including the target number of the location information in the database of the local end, and the location set is the acquired movement path.

Step S210: sending the movement path to the reporting device.

Referring to step S103 for details, and details are not described herein again.

In the embodiments of the present application, when the intelligent locator receives, within the reporting time threshold, the movement path acquisition request sent by the reporting device, the intelligent locator acquires, from the database, the movement path including at least one piece of unreported location information. The intelligent locator only needs to send the movement path including at least one piece of unreported location information to the reporting device after receiving the movement path acquisition request instead of reporting the located movement locations every other period; or the intelligent locator sends the movement path including at least one piece of unreported location information to the reporting device after the reporting time threshold is reached, so that the reporting frequency of the intelligent locator may be reduced, thus power consumption resulting from reporting of the movement locations is reduced, and then the endurance capability of the intelligent locator is improved; meanwhile, the reporting time threshold is dynamically adjusted in combination with the state of charge and the total number of the unreported location information, so that the efficiency of the movement path reporting may be increased, and the actual application environment of the movement path reporting may be better matched; meanwhile, when it is determined that the movement path reporting is carried out, an appropriate target number of the unreported location information is determined in combination with the total number of the unreported location information and communication quality with the reporting device, and the movement path including the target number of the location information is reported, so that the problem that the reporting device cannot receive the movement path in time due to a large amount of data of the reported movement path and poor communication quality, may be avoided.

Figure 6:
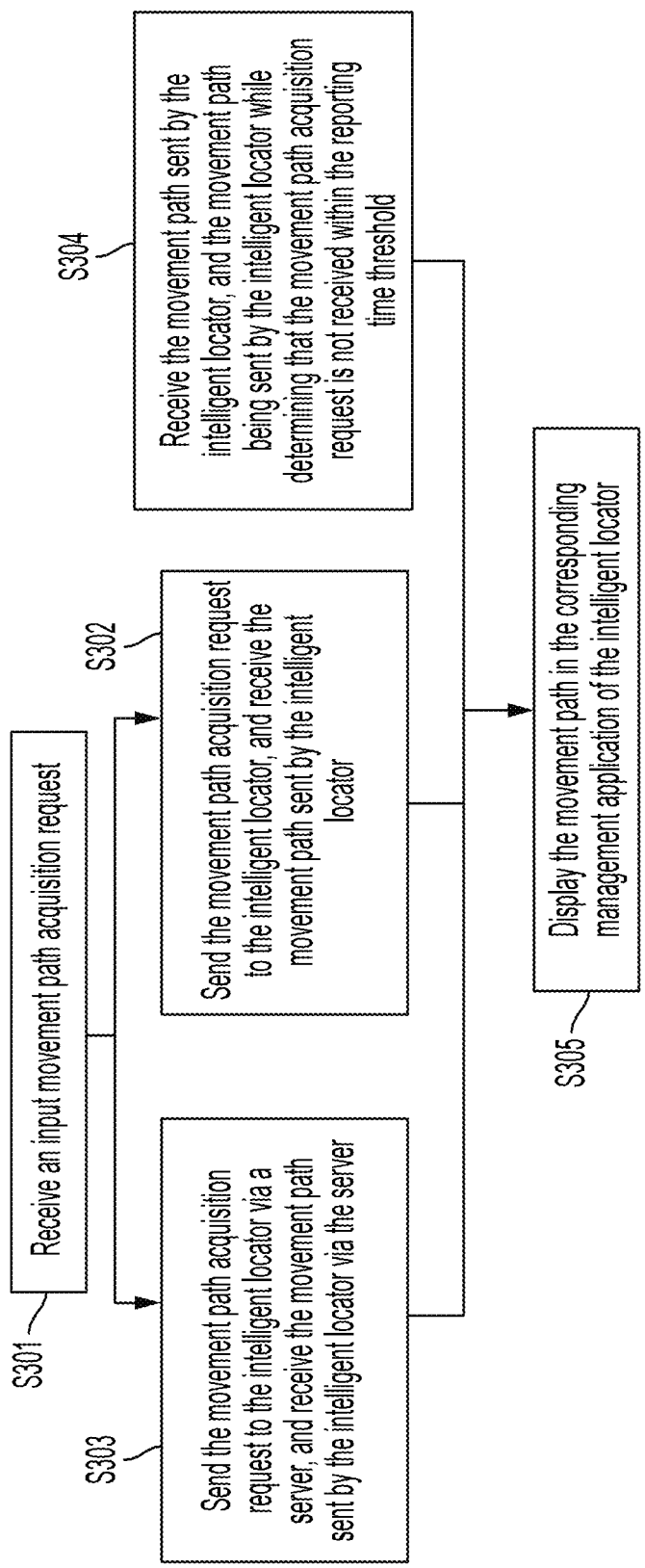
FIG. 6 is a schematic flowchart of another method for reporting a movement path, which is provided by the embodiments of the present application.

Referring to FIG. 6 which is a schematic flowchart of another method for reporting a movement path, which is provided by the present application. The method may be implemented by a computer program and may run in a movement path reporting apparatus and based on a Von Neumann system. The computer program may be integrated into an application or may run as an independent tool application. In the following, in order to better interpret the method for reporting the movement path, the movement path reporting apparatus is taken as a terminal for detailed interpretation.

The terminal may be an electronic device with a Bluetooth function, and the electronic device includes but is not limited to: a wearable device, a handheld device, a personal computer, a tablet personal computer, an on-board device, a calculation device or other processing devices connected to wireless modems, and the like. The user terminals in different networks may be called as different names, for example, user devices, access terminals, user units, user stations, mobile stations, mobile platforms, remote stations, remote terminals, mobile devices, user terminals, terminals, wireless communication devices, user agents or user apparatuses, cellular phones, cordless phones, personal digital assistants (PDAs), terminal devices in 5G networks or future evolution networks, and the like.

Specifically, the method for reporting the movement path includes:

Step S301: receiving an input movement path acquisition request.

The request is an instruction and command for commanding the terminal to work, and may be understood as a code for specifying to execute a certain operation or a certain control of function realization. In the embodiments of the present application, the movement path acquisition request may be understood as a code for commanding the terminal to execute movement path acquisition, and the terminal may send the movement path acquisition request by executing the code.

Specifically, the terminal is installed with a management application of the intelligent locator, and the user may carry out corresponding clicking operation with regard to the intelligent locator in the terminal to input the movement path acquisition request.

Alternatively, the inputting for the movement path acquisition request in the terminal by the user may be completed through an external device, for example, the user may select a "movement path acquisition" icon of the management application of the intelligent locator through a mouse connected with the terminal; or the user may input a corresponding command through a keyboard or a touch pad connected with the terminal to select the movement path acquisition icon; or the user may input the movement path acquisition request with regard to the management application of the intelligent locator through a voice (for example, a voice for acquiring the movement path of the intelligent locator is input through a voice, and the like); or the user may acquire a gesture control instruction through a camera to complete specific gesture operation for acquiring the movement path of the intelligent locator, and the like.

In the following, for the convenience of the description of the embodiments of the present application, the manner of inputting the movement path acquisition request in the manner of touching the terminal through a finger is specifically taken as an example to describe in detail.

Figure 7:
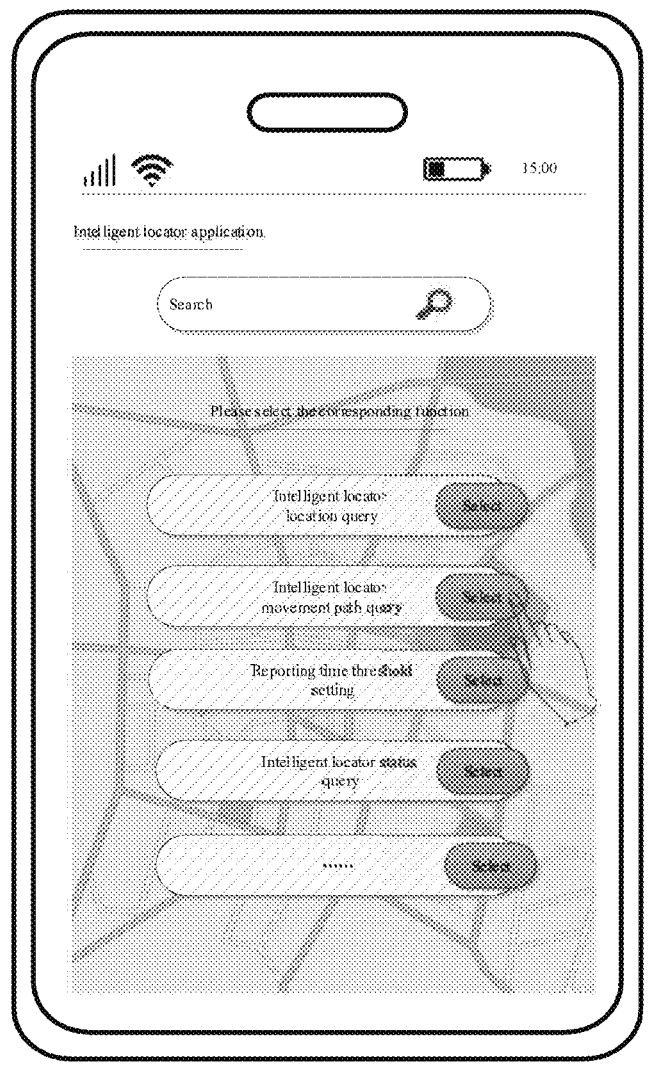
FIG. 7 is a schematic diagram of an application display interface of a terminal involved in a method for reporting a movement path, which is provided by the embodiments of the present application.

The terminal may be provided with a touch screen, and the touch screen may be a touch screen capable of realizing a single touch function, such as a capacitive touch screen and an electromagnetic touch screen, or the touch screen may be a touch screen capable of realizing capacitive sensing, electromagnetic sensing and infrared sensing at the same time. As shown in FIG. 7 which is an interface schematic diagram of an application display interface of a terminal, and a plurality of display options are displayed in the current application interface of the intelligent locator, such as an intelligent locator location query option, an intelligent locator movement path query option, a reporting time threshold setting option, and the like.

As shown in FIG. 7, when the user touches the touch screen of the terminal through a finger, the user selects the "intelligent locator movement path query" option, a capacitance parameter of the touch location of the option is changed, and a touch box determines the touch location of the finger on the touch screen according to the change of capacitance; or, when the finger touches the touch box, an infrared receiving end is blocked from receiving an infrared signal, and the touch box determines the touch location of the finger according to the blocked infrared signal. The terminal detects that the touch location, that is, the location of the "intelligent locator movement path query" option is selected, and then identifies the movement path acquisition request with regard to the intelligent locator, which is input by the user.

Step S302: sending the movement path acquisition request to the intelligent locator, and receiving the movement path sent by the intelligent locator.

The movement path acquisition request is used for indicating the intelligent locator to acquire, from a database, a movement path including at least one piece of unreported location information.

According to some embodiments, when the user carries out the selection operation with regard to the "intelligent locator movement path query" option in the interface of the intelligent locator application of the terminal, the terminal generates the movement path acquisition request; and it may be understood that the terminal may directly communicate on the basis of a communication network between the terminal and the intelligent locator, and after generating the movement path acquisition request, the terminal may send the movement path acquisition request to the intelligent locator on the basis of the communication connection between the terminal and the intelligent locator. At this moment, the intelligent locator may receive the movement path acquisition request sent by the terminal, and the intelligent locator responds to the movement path acquisition request, and acquires the unreported location information from the database of the local end to generate a movement path including at least one piece of unreported location information. It may be understood that the unreported location information includes a movement location and a timestamp, on the basis of the movement location and the timestamp of each piece of the location information in the at least one piece of location information, the movement locations corresponding to the timestamps of the adjacent time points are connected in pairs, and the movement path may be acquired. Then the intelligent locator sends the movement path to the terminal. The terminal may receive the movement path sent by the intelligent locator.

The communication network between the terminal and the intelligent locator may be a wireless network or a wired network, the wireless network includes but is not limited to a cellular network, a wireless local area network, an infrared network or a Bluetooth network, and the wired network includes but is not limited to an Ethernet, a universal serial bus (USB) or a controller area network.

In some embodiments, the terminal uses technologies and/or formats including hyper text mark-up language (HTML), extensible markup language (XML) and the like for representing data exchanged over the network. In addition, conventional encryption technologies such as a secure socket layer (SSL), transport layer security (TLS), a virtual private network (VPN), Internet Protocol Security (IPSec) and the like may also be used for encrypting all or some links. In some other embodiments, customized and/or dedicated data communication technologies may also be used for replacing or supplementing the above data communication technologies.

Step S303: sending the movement path acquisition request to the intelligent locator via a server, and receiving the movement path sent by the intelligent locator via the server.

According to some embodiments, when the user carries out the selection operation with regard to the "intelligent locator movement path query" option in the interface of the intelligent locator application of the terminal, the terminal generates a movement path acquisition request; and the terminal may send the movement path acquisition request to the server, and the server sends the movement path acquisition request to the intelligent locator. It may be understood that the terminal cannot directly communicate with the intelligent locator at this moment, and the server is required to be taken as a relay to forward the received movement path acquisition request. After receiving the movement path acquisition request forwarded via the server, of the terminal, the intelligent locator acquires, from a database, a movement path including at least one piece of unreported location information, and sends the movement path to the server, the server sends the movement path to the terminal, and at this moment, the terminal may receive the movement path sent by the intelligent locator and forwarded via the server.

Step S304: receiving the movement path sent by the intelligent locator, and the movement path being sent by the intelligent locator while determining that the movement path acquisition request is not received within the reporting time threshold.

According to some embodiments, the intelligent locator is set with a reporting time threshold, when the intelligent locator receives, within the reporting time threshold, the movement path acquisition request sent by the reporting device (such as a terminal and a server), the intelligent locator responds to the movement path acquisition request, acquires the movement path from the database, and directly sends the movement path to the terminal through communication connection with the terminal. At this moment, the terminal may receive the movement path sent by the intelligent locator.

According to some embodiments, the intelligent locator is set with a reporting time threshold, when the intelligent locator receives, within the reporting time threshold, the movement path acquisition request sent by the reporting device (such as a terminal and a server), the intelligent locator responds to the movement path acquisition request, acquires the movement path from the database, and sends the movement path to the server through communication connection with the server. At this moment, the server is taken as a relaying device, and sends the movement path to the terminal; and at this moment, the terminal may receive the movement path sent by the intelligent locator and forwarded via the server.

Step S305: displaying the movement path in the corresponding management application of the intelligent locator.

The corresponding management application of the intelligent locator may be understood as an application which is developed by a third party and not included in the own operation system of the terminal, and used for controlling the intelligent locator, including some applications, applets, plug-ins and the like which are developed by the third party. In the embodiments, the management application may be understood as an application other than preset system applications of the operation system of the terminal, and the management application may run in the terminal.

Figure 8:
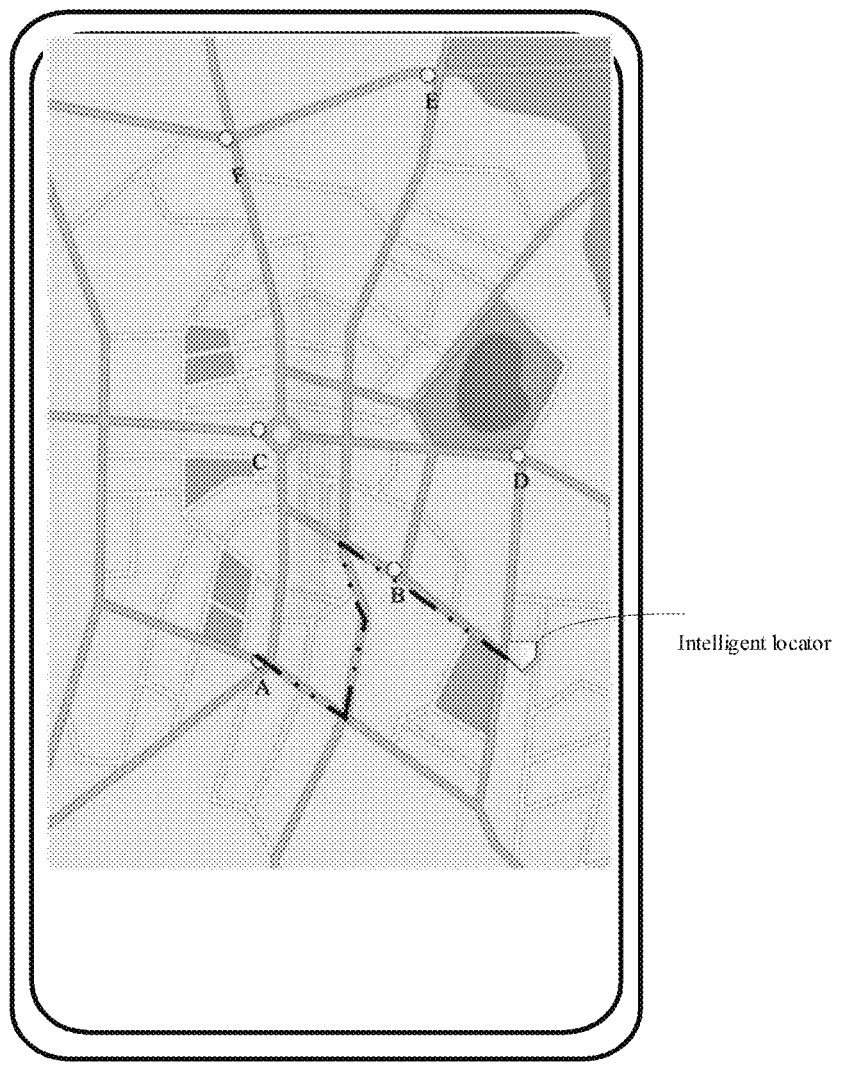
FIG. 8 is a schematic diagram of a movement path of an intelligent locator involved in a method for reporting a movement path, which is provided by the embodiments of the present application.

Specifically, when the intelligent locator acquires the movement path and sends the movement path to the terminal, the terminal receives the movement path sent by the intelligent locator, usually, the movement path is sent in the form of a location set including at least one piece of location information, wherein the location information includes a movement location of the intelligent locator and a timestamp corresponding to the movement location, and at this moment, the terminal may connect the movement locations corresponding to the timestamps of the adjacent time points in the location set in pairs to acquire the movement path to be displayed. Schematically, in the "intelligent locator" application shown in FIG. 7, the user may click the "intelligent locator movement path query" option in a manner of finger touch, after the movement path sent by the intelligent locator is acquired, the movement path is loaded, the movement path to be displayed is displayed in the current display interface of the terminal, as shown in FIG. 8 which is a schematic diagram of the movement path of the intelligent locator, and in the schematic interface of the movement path, which is shown in FIG. 8, the user may clearly view the activity range of the intelligent locator.

In the embodiments of the present application, the terminal receives the input movement path acquisition request, and sends the movement path acquisition request to the intelligent locator, the movement path acquisition request is used for indicating the intelligent locator to acquire, from the database, a movement path including at least one piece of unreported location information, and the terminal receives the movement path sent by the intelligent locator. While receiving the movement path acquisition request, the terminal sends the movement path acquisition request to the intelligent locator to acquire the movement path. The intelligent locator only needs to send the movement path including at least one piece of unreported location information to the reporting device after the terminal sends the movement path acquisition request instead of reporting the located movement locations every other period, so that the reporting frequency of the intelligent locator may be reduced, thus power consumption resulting from reporting of the movement locations is reduced, and then the endurance capability of the intelligent locator is improved.

The followings are the apparatus embodiments of the present application, which may be used for executing the method embodiments of the present application. Referring to the method embodiments of the present application for details which are not disclosed in the apparatus embodiments of the present application.

Figure 9:
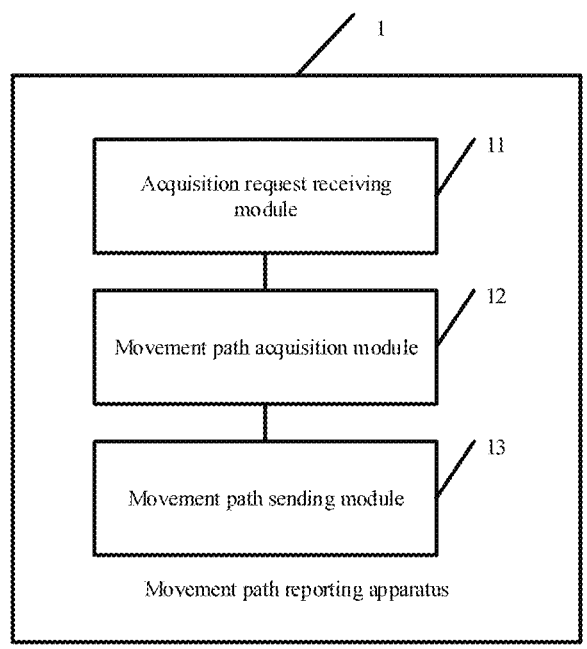
FIG. 9 is a schematic structural diagram of a movement path reporting apparatus, which is provided by the embodiments of the present application.

Refer to FIG. 9 which shows a schematic structural diagram of a movement path reporting apparatus, which is provided by an exemplary embodiment of the present application. The movement path reporting apparatus may be realized as all or part of the apparatus through software, hardware or a combination of both. The apparatus 1 includes an acquisition request receiving module 11, a movement path acquisition module 12, and a movement path sending module 13.

The acquisition request receiving module 11 is used for receiving, within a reporting time threshold, a movement path acquisition request sent by a reporting device.

The movement path acquisition module 12 is used for acquiring, from a database, a movement path including at least one piece of unreported location information.

The movement path sending module 13 is used for sending the movement path to the reporting device.

Alternatively, the acquisition request receiving module 11 is specifically used for:
  receiving a movement path acquisition request sent by a terminal via a server; or,
  receiving a movement path acquisition request sent by the terminal; or,
  receiving a movement path acquisition request sent by the server.

Figure 11:
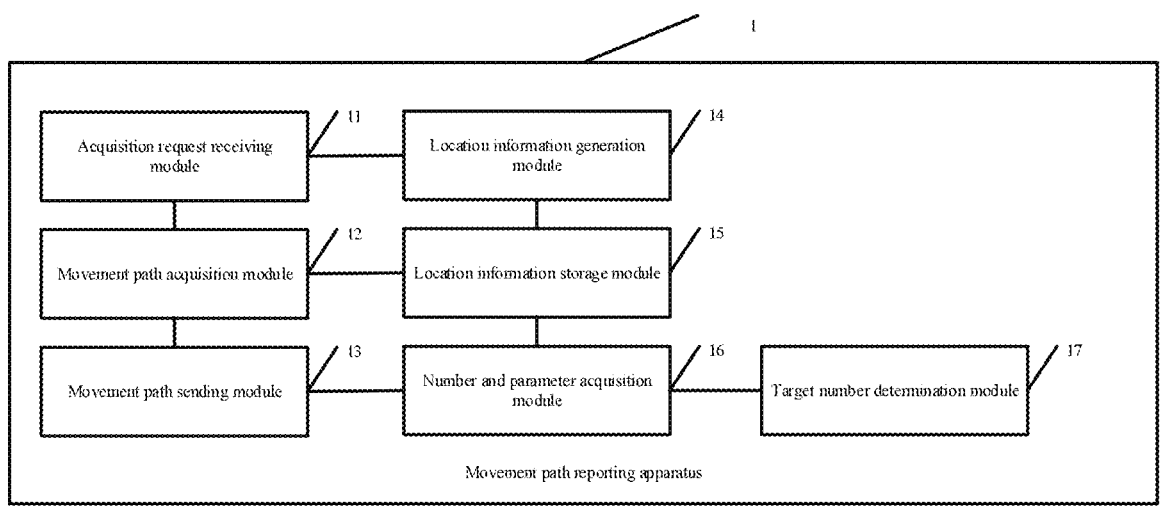
FIG. 11 is a schematic structural diagram of another movement path reporting apparatus, which is provided by the embodiments of the present application.

Alternatively, as shown in FIG. 11, the apparatus 1 includes:
  a location information generation module 14 used for acquiring at least one movement location and a timestamp corresponding to each movement location according to a preset period, adding the timestamp to each movement location, and generating location information corresponding to the movement location; and
  a location information storage module 15 used for storing the location information into a database.

Alternatively, the acquisition request receiving module 11 is specifically used for:
  determining that the movement path acquisition request is not received within the reporting time threshold, and executing the step of acquiring the movement path from the database.

Alternatively, as shown in FIG. 11, the acquisition request receiving module 11 includes:
  a number and circuit acquisition unit 111 used for acquiring a total number of the unreported location information in the database, and a current state of charge; and
  a time threshold updating unit 112 used for determining reference reporting time on the basis of the total number and the state of charge, and updating the reporting time threshold to be the reference reporting time.

Figure 10:
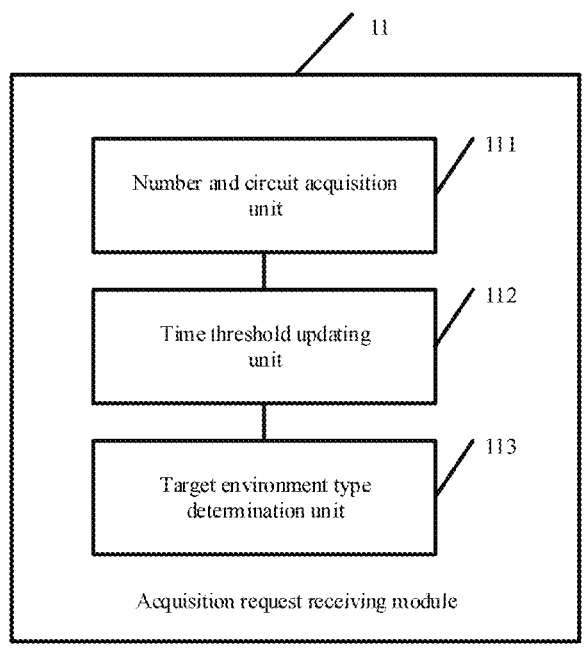
FIG. 10 is a schematic structural diagram of an acquisition request receiving module which is provided by the embodiments of the present application.

Alternatively, as shown in FIG. 10, the acquisition request receiving module 11 includes:
  a target environment type determination unit 113 used for determining the type of a target environment where the intelligent locator is located according to at least one piece of the location information; and
  the time threshold updating unit 112 is further used for determining the reference reporting time corresponding to the type of the target environment according to a corresponding relationship between the environment type and the reporting time, and updating the reporting time threshold to be the reference reporting time.

Alternatively, as shown in FIG. 11, the apparatus 1 includes:
  a number and parameter acquisition module 16 used for acquiring a communication parameter with the reporting device, and a total number of the unreported location information in the database; and
  a target number determination module 17 used for determining a target number of the unreported location information to be acquired according to the communication parameter and the total number.

The movement path acquisition module 12 is used for acquiring, from the database, a movement path including the unreported location information indicated by the target number.

It needs to be noted that, when the movement path reporting apparatus, which is provided by the above embodiments, executes the method for reporting the movement path, only division of the above functional modules is taken as an example for description, in practical applications, the above functions may be allocated to be completed by different functional modules as needed, that is, the internal structure of the device is divided into different functional modules, so that all or part of the above functions are completed. In addition, the movement path reporting apparatus, which is provided by the above embodiments, and the method embodiment for reporting the movement path belong to the same concept, and an implementation process of the apparatus is detailed in the method embodiments, and details are not described herein again.

The serial numbers of the embodiments of the present application are merely for description, and do not represent the advantages and disadvantages of the embodiments.

In the embodiments, when the intelligent locator receives, within the reporting time threshold, the movement path acquisition request sent by the reporting device, the intelligent locator acquires, from the database, the movement path including at least one piece of unreported location information. The intelligent locator only needs to send the movement path including at least one piece of unreported location information to the reporting device after receiving the movement path acquisition request instead of reporting the located movement locations every other period; or the intelligent locator sends the movement path including at least one piece of unreported location information to the reporting device after the reporting time threshold is reached, so that the reporting frequency of the intelligent locator may be reduced, thus power consumption resulting from reporting of the movement locations is reduced, and then the endurance capability of the intelligent locator is improved; meanwhile, the reporting time threshold is dynamically adjusted in combination with the state of charge and the total number of the unreported location information, so that the efficiency of the movement path reporting may be increased, and the actual application environment of the movement path reporting may be better matched; meanwhile, when it is determined that the movement path reporting is carried out, an appropriate target number of the unreported location information is determined in combination with the total number of the unreported location information and communication quality with the reporting device, and the movement path including the target number of the location information is reported, so that the problem that the reporting device cannot receive the movement path in time due to a large amount of data of the reported movement path and poor communication quality, may be avoided.

Figure 12:
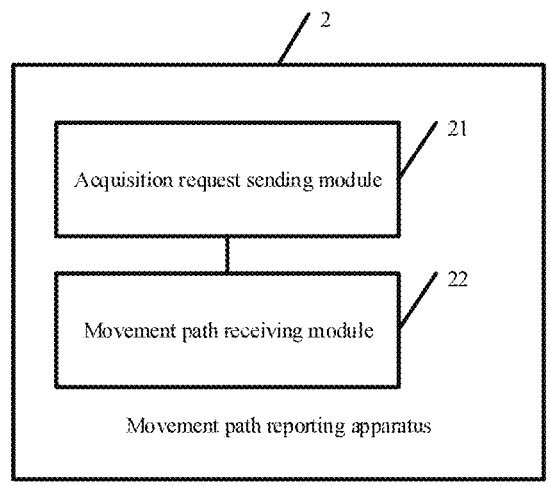
FIG. 12 is a schematic structural diagram of another movement path reporting apparatus, which is provided by the embodiments of the present application.

Refer to FIG. 12 which shows a schematic structural diagram of a movement path reporting apparatus, which is provided by an exemplary embodiment of the present application. The movement path reporting apparatus may be realized as all or part of the apparatus through software, hardware or a combination of both. The apparatus 2 includes an acquisition request sending module 21 and a movement path receiving module 22.

The acquisition request sending module 21 is used for receiving an input movement path acquisition request and sending the movement path acquisition request to an intelligent locator, and the movement path acquisition request being used for indicating the intelligent locator to acquire, from a database, a movement path including at least one piece of unreported location information.

The movement path receiving module 22 is used for receiving the movement path sent by the intelligent locator.

Alternatively, the acquisition request sending module 21 is specifically used for:
  sending the movement path acquisition request to the intelligent locator via the server; and the movement path receiving module 22 is specifically used for:
receiving the movement path sent by the intelligent locator via the server.

Figure 13:
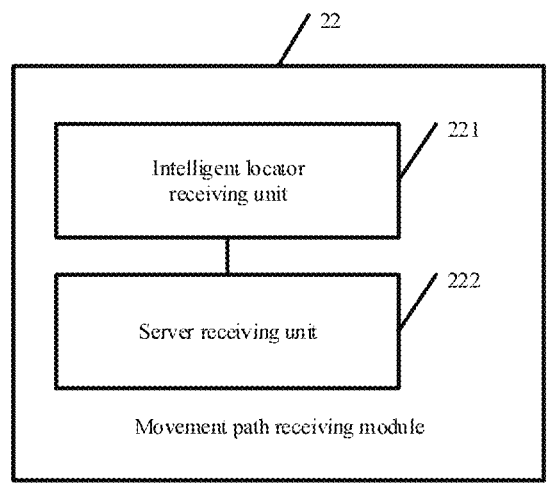
FIG. 13 is a schematic structural diagram of a movement path receiving module which is provided by the embodiments of the present application.

Alternatively, as shown in FIG. 13, the movement path receiving module 22 includes:
an intelligent locator receiving unit 221 used for receiving the movement path sent by the intelligent locator, and the movement path being sent by the intelligent locator while determining that the movement path acquisition request is not received within the reporting time threshold; and
a server receiving unit 222 used for receiving the movement path sent by the server, and the movement path being sent to the server by the intelligent locator while determining that the movement path acquisition request is not received within the reporting time threshold.

Figure 14:
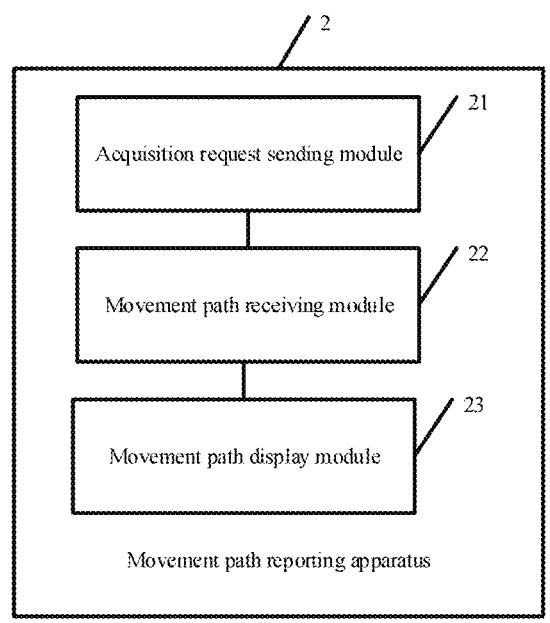
FIG. 14 is a schematic structural diagram of another movement path reporting apparatus, which is provided by the embodiments of the present application.

Alternatively, as shown in FIG. 14, the apparatus 2 includes:
a movement path display module 23 used for displaying the movement path in the corresponding management application of the intelligent locator.

It needs to be noted that, when the movement path reporting apparatus, which is provided by the above embodiments, executes the method for reporting the movement path, only division of the above functional modules is taken as an example for description, in practical applications, the above functions may be allocated to be completed by different functional modules as needed, that is, the internal structure of the device is divided into different functional modules, so that all or part of the above functions are completed. In addition, the movement path reporting apparatus, which is provided by the above embodiments, and the method embodiment for reporting the movement path belong to the same concept, and an implementation process of the apparatus is detailed in the method embodiments, and details are not described herein again.

The serial numbers of the embodiments of the present application are merely for description, and do not represent the advantages and disadvantages of the embodiments.

In the embodiments of the present application, the terminal receives the input movement path acquisition request, and sends the movement path acquisition request to the intelligent locator, the movement path acquisition request is used for indicating the intelligent locator to acquire, from the database, a movement path including at least one piece of unreported location information, and the terminal receives the movement path sent by the intelligent locator. While receiving the movement path acquisition request, the terminal sends the movement path acquisition request to the intelligent locator to acquire the movement path. The intelligent locator only needs to send the movement path including at least one piece of unreported location information to the reporting device after the terminal sends the movement path acquisition request instead of reporting the located movement locations every other period, so that the reporting frequency of the intelligent locator may be reduced, thus power consumption resulting from reporting of the movement locations is reduced, and then the endurance capability of the intelligent locator is improved.

The embodiments of the present application further provide a computer storage medium, a plurality of instructions may be stored in the computer storage medium, the instructions are suitable for being loaded by a processor and executing the method for reporting the movement path, of the embodiments shown in above FIG. 1 to FIG. 8, and referring to the specific description of the embodiments shown in FIG. 1 to FIG. 8 for the specific execution process, and details are not described herein again.

The present application further provides a computer program product, at least one instruction is stored in the computer program product, the at least one instruction is loaded by a processor and executes the method for reporting the movement path, of the embodiments shown in above FIG. 1 to FIG. 8, and referring to the specific description of the embodiments shown in FIG. 1 to FIG. 8 for the specific execution process, and details are not described herein again.

Figure 15:
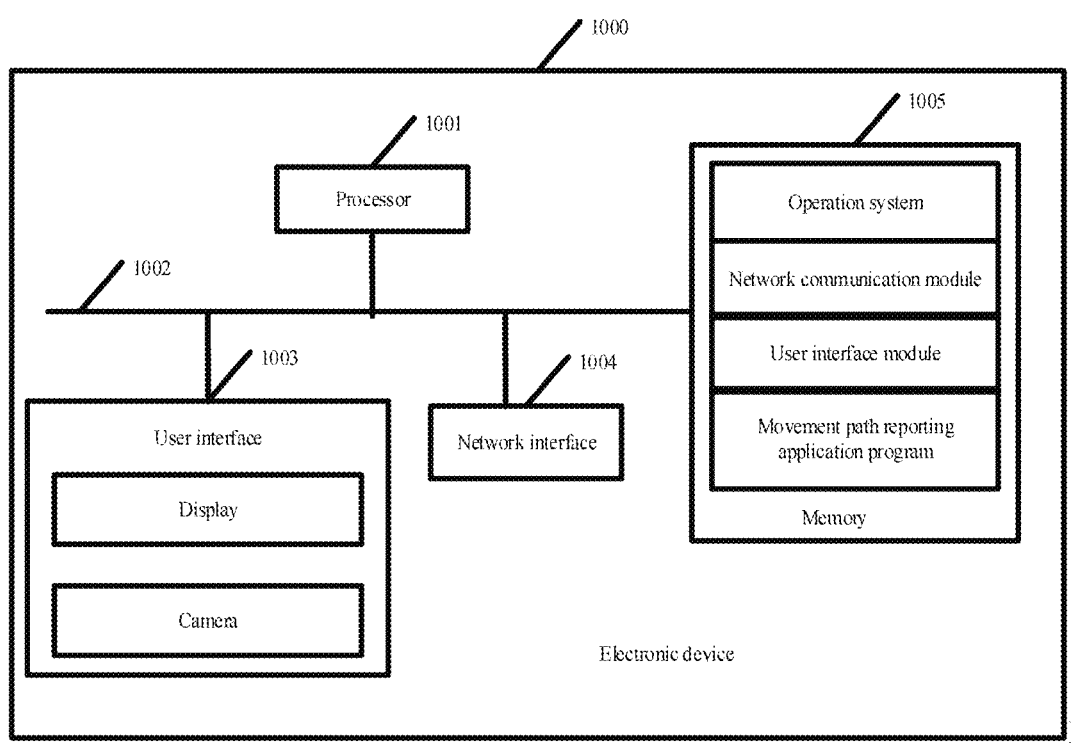
FIG. 15 is a schematic structural diagram of an electronic device which is provided by the embodiments of the present application.

Referring to FIG. 15 which provides a schematic structural diagram of an electronic device for the embodiments of the present application. As shown in FIG. 15, the electronic device 1000 may include: at least one processor 1001, at least one network interface 1004, a user interface 1003, a memory 1005, and at least one communication bus 1002.

The communication bus 1002 is used for realizing connection communication among these components.

The user interface 1003 may include a display and a camera, and alternatively, the user interface 1003 may also include standard wired interfaces and wireless interfaces.

The network interface 1004 may alternatively include standard wired interfaces and wireless interfaces (such as Wi-Fi interfaces).

The processing 1001 may include one or more processor cores. The processor 1001 is connected with the various parts in the whole server 1000 by virtue of the various interfaces and lines, and executes various functions of the server 1000 and processes data by running or executing the instructions, programs, code sets or instruction sets stored in the memory 1005, and by calling the data stored in the memory 1005. Alternatively, the processor 1001 may be realized in at least one hardware form of digital signal processing (DSP), field-programmable gate array (FPGA), and programmable logic array (PLA). The processor 1001 may integrate one or a combination of more of a central processing unit (CPU), a graphics processing unit (GPU), a modem and the like. The CPU mainly handles an operation system, a user interface, application programs and the like; the GPU is used for taking charge of rendering and drawing a content needing to be displayed in the display; and the modem is used for handling wireless communication. It may be understood that the above modem may also be realized by a single chip without being integrated into the processor 1001.

The memory 1005 may include a random access memory (RAM) or a read-only memory. Alternatively, the memory 1005 includes a non-transitory computer-readable storage medium. The memory 1005 may be used for storing the instructions, programs, codes, code sets or instruction sets. The memory 1005 may include a program storage area and a data storage area, wherein instructions used for realizing the operation system, instructions used for at least one function (such as a touch function, a sound playing function, an image playing function and the like), instructions used for realizing the above method embodiments, and the like may be stored in the program storage area; and the data and the like involved in the above method embodiments may be stored in the storage data area. The memory 1005 may alternatively be at least one storage apparatus located away from the above processor 1001. As shown in FIG. 15, the memory 1005 which is taken as a computer storage medium may include the operation system, a network communication module, a user interface module, and a movement path reporting application program.

In the electronic device 1000 shown in FIG. 15, the user interface 1003 is mainly used for providing an interface for the user to input and acquiring the data input by the user; and the processor 1001 may be used for calling the movement path reporting application program stored in the memory 1005, and specifically executes the following operations:

receiving, within a reporting time threshold, a movement path acquisition request sent by a reporting device;

acquiring, from a database, a movement path including at least one piece of unreported location information; and sending the movement path to the reporting device.

In one embodiment, the processor 1001 specifically executes the following operations while executing the receiving the movement path acquisition request sent by the reporting device:

receiving a movement path acquisition request sent by a terminal via a server; or, receiving a movement path acquisition request sent by the terminal; or, receiving a movement path acquisition request sent by the server.

In one embodiment, the processor 1001 further executes the following operations before executing the receiving the movement path acquisition request sent by the reporting device:

acquiring at least one movement location and a timestamp corresponding to each movement location according to a preset period, adding the timestamp to each movement location, and generating location information corresponding to the movement location; and storing the location information into the database.

In one embodiment, the processor 1001 specifically executes the following operations while executing the method for reporting the movement path:

determining that the movement path acquisition request is not received within the reporting time threshold, and executing the step of acquiring the movement path from the database.

In one embodiment, the processor 1001 specifically executes the following operations while executing the method for reporting the movement path:

acquiring a total number of the unreported location information in the database, and a current state of charge; and determining reference reporting time on the basis of the total number and the state of charge, and updating the reporting time threshold to be the reference reporting time.

In one embodiment, the processor 1001 specifically executes the following operations while executing the method for reporting the movement path:

determining the type of a target environment where the intelligent locator is located according to at least one piece of the location information; and determining the reference reporting time corresponding to the type of the target environment according to a corresponding relationship between the environment type and the reporting time, and updating the reporting time threshold to be the reference reporting time.

In one embodiment, the processor 1001 further executes the following operations before executing the acquiring, from the database, a movement path including at least one piece of unreported location information:

acquiring a communication parameter with the reporting device, and a total number of the unreported location information in the database; and determining a target number of the unreported location information to be acquired according to the communication parameter and the total number.

The acquiring, from the database, a movement path including at least one piece of unreported location information includes:

acquiring, from the database, a movement path including the unreported location information indicated by the target number.

In the embodiments, when the intelligent locator receives, within the reporting time threshold, the movement path acquisition request sent by the reporting device, the intelligent locator acquires, from the database, the movement path including at least one piece of unreported location information. The intelligent locator only needs to send the movement path including at least one piece of unreported location information to the reporting device after receiving the movement path acquisition request instead of reporting the located movement locations every other period; or the intelligent locator sends the movement path including at least one piece of unreported location information to the reporting device after the reporting time threshold is reached, so that the reporting frequency of the intelligent locator may be reduced, thus power consumption resulting from reporting of the movement locations is reduced, and then the endurance capability of the intelligent locator is improved; meanwhile, the reporting time threshold is dynamically adjusted in combination with the state of charge and the total number of the unreported location information, so that the efficiency of the movement path reporting may be increased, and the actual application environment of the movement path reporting may be better matched; meanwhile, when it is determined that the movement path reporting is carried out, an appropriate target number of the unreported location information is determined in combination with the total number of the unreported location information and communication quality with the reporting device, and the movement path including the target number of the location information is reported, so that the problem that the reporting device cannot receive the movement path in time due to a large amount of data of the reported movement path and poor communication quality, may be avoided.

Figure 16:
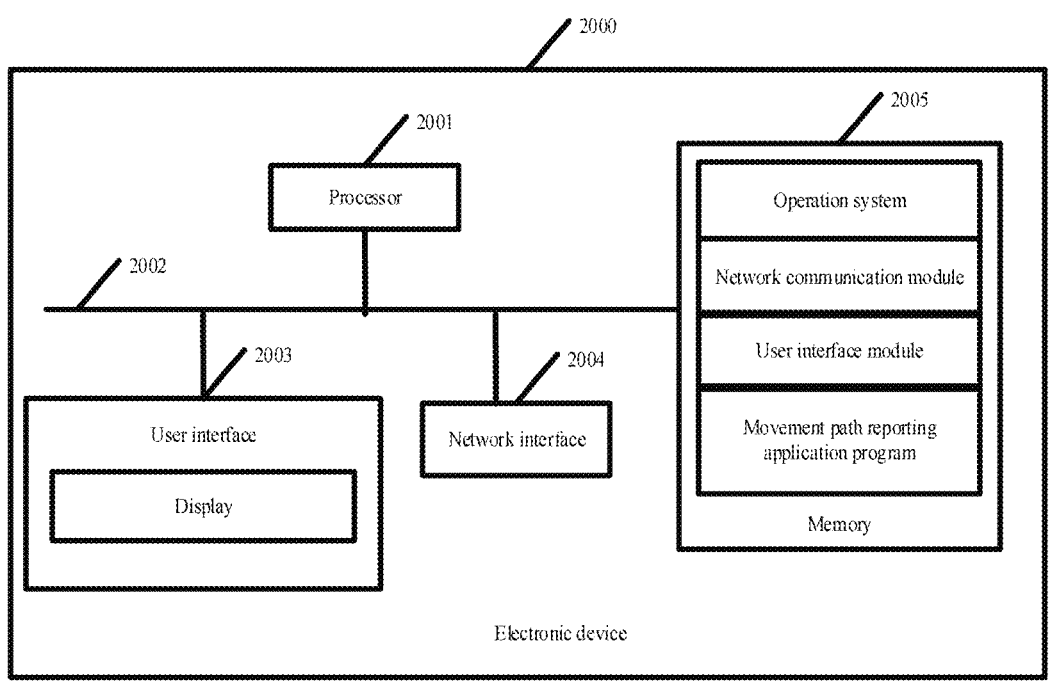
FIG. 16 is a schematic structural diagram of another electronic device which is provided by the embodiments of the present application.

Referring to FIG. 16 which provides a schematic structural diagram of another electronic device for the embodiments of the present application. As shown in FIG. 16, the electronic device 2000 may include: at least one processor 2001, at least one network interface 2004, a user interface 2003, a memory 2005, and at least one communication bus 2002.

The communication bus 2002 is used for realizing connection communication among these components.

The user interface 2003 may include a display, and alternatively, the user interface 2003 may also include standard wired interfaces and wireless interfaces.

The network interface 2004 may alternatively include standard wired interfaces and wireless interfaces (such as Wi-Fi interfaces).

The processing 2001 may include one or more processor cores. The processor 2001 is connected with the various parts in the whole server 2000 by virtue of the various interfaces and lines, and executes various functions of the server 2000 and processes data by running or executing the instructions, programs, code sets or instruction sets stored in the memory 2005, and by calling the data stored in the memory 2005. Alternatively, the processor 2001 may be realized in at least one hardware form of digital signal processing (DSP), field-programmable gate array (FPGA), and programmable logic array (PLA). The processor 2001 may integrate one or a combination of more of a central processing unit (CPU), a graphics processing unit (GPU), a modem and the like. The CPU mainly handles an operation system, a user interface, application programs and the like; the GPU is used for taking charge of rendering and drawing a content needing to be displayed in the display; and the modem is used for handling wireless communication. It may be understood that the above modem may also be realized by a single chip without being integrated into the processor 2001.

The memory 2005 may include a random access memory (RAM) or a read-only memory. Alternatively, the memory 2005 includes a non-transitory computer-readable storage medium. The memory 2005 may be used for storing the instructions, programs, codes, code sets or instruction sets. The memory 1005 may include a program storage area and a data storage area, wherein instructions used for realizing the operation system, instructions used for at least one function (such as a touch function, a sound playing function, an image playing function and the like), instructions used for realizing the above method embodiments, and the like may be stored in the program storage area; and the data and the like involved in the above method embodiments may be stored in the storage data area. The memory 2005 may alternatively be at least one storage apparatus located away from the above processor 2001. As shown in FIG. 16, the memory 2005 which is taken as a computer storage medium may include the operation system, a network communication module, a user interface module, and a movement path reporting application program.

In the electronic device 2000 shown in FIG. 16, the user interface 2003 is mainly used for providing an interface for the user to input and acquiring the data input by the user; and the processor 2001 may be used for calling the movement path reporting application program stored in the memory 2005, and specifically executes the following operations:

receiving an input movement path acquisition request and sending the movement path acquisition request to an intelligent locator, and the movement path acquisition request being used for indicating the intelligent locator to acquire, from a database, a movement path including at least one piece of unreported location information; and receiving the movement path sent by the intelligent locator.

In one embodiment, the processor 2001 specifically executes the following operations while executing the sending the movement path acquisition request to the intelligent locator:

sending the movement path acquisition request to the intelligent locator via the server; and The receiving the movement path sent by the intelligent locator includes:

receiving the movement path sent by the intelligent locator via the server.

In one embodiment, the processor 2001 specifically executes the following operations while executing the method for reporting the movement path:

receiving the movement path sent by the intelligent locator, and the movement path being sent by the intelligent locator while determining that the movement path acquisition request is not received within the reporting time threshold; or, receiving the movement path sent by the intelligent locator, and the movement path being sent to the server by the intelligent locator while determining that the movement path acquisition request is not received within the reporting time threshold.

In one embodiment, the processor 2001 further executes the following operations after executing the receiving the movement path sent by the intelligent locator:

displaying the movement path in the corresponding management application of the intelligent locator.

In the embodiments of the present application, the terminal receives the input movement path acquisition request, and sends the movement path acquisition request to the intelligent locator, the movement path acquisition request is used for indicating the intelligent locator to acquire, from the database, a movement path including at least one piece of unreported location information, and the terminal receives the movement path sent by the intelligent locator. While receiving the movement path acquisition request, the terminal sends the movement path acquisition request to the intelligent locator to acquire the movement path. The intelligent locator only needs to send the movement path including at least one piece of unreported location information to the reporting device after the terminal sends the movement path acquisition request instead of reporting the located movement locations every other period, so that the reporting frequency of the intelligent locator may be reduced, thus power consumption resulting from reporting of the movement locations is reduced, and then the endurance capability of the intelligent locator is improved.

Those skilled in the art may clearly know that the technical solutions of the present application may be realized by the aid of software and/or hardware. The "unit" and "module" in the description are software and/or hardware capable of completing specific functions independently or by cooperating with other components, for example, the hardware may be a field-programmable gate array (FPGA), an integrated circuit (IC), and the like.

It needs to be noted that for the sake of simple description, the above method embodiments are expressed as a series of action combinations, but those skilled in the art should be aware that the present application is not limited by the described action sequence, because according to the present application, some steps may be carried out in other sequences or at the same time. Secondly, those skilled in the art should also be aware that the embodiments described in the description are all preferred embodiments, and the actions and modules involved are not necessarily essential for the present application.

In the above embodiments, the description of the embodiments has respective emphasis, and referring to the relevant description of the other embodiments for the parts which are not described in detail in a certain embodiment.

In the several embodiments provided in the present application, it should be understood that the disclosed apparatus may be realized in other manners. For example, the above-described apparatus embodiments are merely schematic, for example, the division of the units is merely a logical function division, and there may be other division manners in actual realization, for example, a plurality of units or components may be combined or integrated into another system, or some features may be ignored or not executed. Another point is that the mutual coupling or direct coupling or communication connection shown or discussed may be indirect coupling or communication connection of the apparatuses or units through some service interfaces, and may be electrical or in other forms.

The units described as separate components may or may not be physically separated, and the components displayed as units may or may not be physical units, that is, the components may be located in one place, or may be distributed to a plurality of network units. Part or all of the units may be selected according to actual needs to realize the objectives of the solutions of the embodiments.

The above is merely exemplary embodiments of the present disclosure and cannot limit the scope of the present disclosure. That is, all equivalent changes and modifications made in accordance with the teachings of the present disclosure are still within the scope of the present disclosure. Those skilled in the art would readily conceive of other implementation solutions of the present disclosure after considering the description and practicing the disclosure herein. The present application is intended to cover any variations, uses or adaptive changes of the present disclosure, and these variations, uses or adaptive changes follow the general principle of the present disclosure and include common general knowledge or conventional technical means that are not disclosed in the present disclosure, in the technical field. The description and the embodiments are merely regarded as exemplary, and the scope and spirit of the present disclosure are limited by the claims.

What is claimed is:

1. A method for reporting a movement path, applied to an intelligent locator, and comprising:
   receiving, within a reporting time threshold, a movement path acquisition request sent by a reporting device; wherein, the reporting time threshold is set through a customization manner, and the customization manner comprises setting the reporting time threshold through the reporting device wherein the reporting device establishes a pairing relationship with the intelligent locator;
   acquiring, from a database, a movement path comprising at least one piece of unreported location information; and
   sending the movement path to the reporting device;
   wherein before the acquiring, from a database, a movement path comprising at least one piece of unreported location information, the method further comprises:
   acquiring a communication parameter with the reporting device, and a total number of the unreported location information in the database; and
   determining a target number of the unreported location information to be acquired according to the communication parameter and the total number;
   and the acquiring, from a database, a movement path comprising at least one piece of unreported location information comprises:
   acquiring, from the database, a movement path including the unreported location information indicated by the target number.

2. The method according to claim 1, wherein the receiving a movement path acquisition request sent by a reporting device comprises:
   receiving a movement path acquisition request sent by a terminal via a server; or,
   receiving a movement path acquisition request sent by a terminal; or,
   receiving a movement path acquisition request sent by a server.

3. The method according to claim 1, wherein before the receiving a movement path acquisition request sent by a reporting device, the method further comprises:
   acquiring at least one movement location and a timestamp corresponding to the movement location according to a preset period, adding the timestamp to each movement location, and generating location information corresponding to the movement location; and
   storing the location information into the database.

4. The method according to claim 1, wherein the method further comprises:
   determining that the movement path acquisition request is not received within the reporting time threshold, and executing the step of acquiring the movement path from the database.

5. The method according to claim 4, wherein the method further comprises:
   acquiring a total number of the unreported location information in the database, and a current state of charge; and
   determining reference reporting time on the basis of the total number and the state of charge, and updating the reporting time threshold to be the reference reporting time.

6. The method according to claim 4, wherein the method further comprises:
   determining the type of a target environment where the intelligent locator is located according to at least one piece of the location information; and
   determining the reference reporting time corresponding to the type of the target environment according to a corresponding relationship between the environment type and the reporting time, and updating the reporting time threshold to be the reference reporting time.

7. A method for reporting a movement path, applied to a terminal, and comprising:
   setting a reporting time threshold of an intelligent locator, wherein the terminal establishes a pairing relationship with the intelligent locator, and the intelligent locator is configured to respond to a movement path acquisition request receive received within the reporting time threshold;
   receiving the movement path acquisition request inputted, and sending the movement path acquisition request to the intelligent locator, the movement path acquisition request being used for indicating the intelligent locator to acquire, from a database, a movement path comprising at least one piece of unreported location information; and
   receiving the movement path sent by the intelligent locator;
   wherein the movement path acquisition request being used for indicating the intelligent locator to acquire, from a database, a movement path comprising at least one piece of unreported location information comprises:
   the movement path acquisition request being used for indicating the intelligent locator to acquire, from the database, a movement path including the unreported location information indicated by a target number, wherein the target number of the unreported location information is determined according to a communication parameter and a total number, and the communication parameter with the reporting device and the total number of the unreported location information in the database are acquired by the intelligent locator.

8. The method according to claim 7, wherein the sending the movement path acquisition request to the intelligent locator comprises:
   sending the movement path acquisition request to the intelligent locator via a server;
   and the receiving the movement path sent by the intelligent locator comprises:

receiving the movement path sent by the intelligent locator via the server.

9. The method according to claim 8, wherein the method further comprises:
receiving the movement path sent by the intelligent locator, and the movement path being sent by the intelligent locator while determining that the movement path acquisition request is not received within the reporting time threshold; or,
receiving the movement path sent by the server, and the movement path being sent to the server by the intelligent locator while determining that the movement path acquisition request is not received within the reporting time threshold.

10. The method according to claim 7, wherein after the receiving the movement path sent by the intelligent locator, the method further comprises:
displaying the movement path in the corresponding management application of the intelligent locator.

11. An electronic device, comprising: a processor and a memory, wherein a computer program is stored in the memory, and the computer program is suitable for being loaded by the processor and a method for reporting a movement path, applied to an intelligent locator, and comprising:
receiving, within a reporting time threshold, a movement path acquisition request sent by a reporting device;
wherein, the reporting time threshold is set through a customization manner, and the customization manner comprises setting the reporting time threshold through the reporting device wherein the reporting device establishes a pairing relationship with the intelligent locator;
acquiring, from a database, a movement path comprising at least one piece of unreported location information; and
sending the movement path to the reporting device;
wherein before the acquiring, from a database, a movement path comprising at least one piece of unreported location information, the method further comprises:
acquiring a communication parameter with the reporting device, and a total number of the unreported location information in the database; and
determining a target number of the unreported location information to be acquired according to the communication parameter and the total number;
and the acquiring, from a database, a movement path comprising at least one piece of unreported location information comprises:
acquiring, from the database, a movement path including the unreported location information indicated by the target number.

* * * * *